United States Patent
Lu et al.

(10) Patent No.: US 9,362,749 B2
(45) Date of Patent: Jun. 7, 2016

(54) CONTROLLER FOR THERMOSTATICALLY CONTROLLED LOADS

(75) Inventors: Ning Lu, Richland, WA (US); Yu Zhang, Richland, WA (US); Pengwei Du, Richland, WA (US); Yuri V. Makarov, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 695 days.

(21) Appl. No.: 13/452,340

(22) Filed: Apr. 20, 2012

(65) Prior Publication Data

US 2013/0282181 A1 Oct. 24, 2013

(51) Int. Cl.
| G05B 15/00 | (2006.01) |
| G05D 23/19 | (2006.01) |
| H02J 3/14 | (2006.01) |
| F24F 11/00 | (2006.01) |

(52) U.S. Cl.
CPC ............... *H02J 3/14* (2013.01); *F24F 11/001* (2013.01); *G05D 23/1902* (2013.01); *G05D 23/1917* (2013.01); *G05D 23/1931* (2013.01); *F24F 2011/0046* (2013.01); *F24F 2011/0058* (2013.01); *Y02B 70/3225* (2013.01); *Y02B 70/3275* (2013.01); *Y04S 20/222* (2013.01); *Y04S 20/244* (2013.01)

(58) Field of Classification Search
CPC .............. G05D 23/19; G05D 23/1902; G05D 23/1917; G05D 23/1931; F24F 11/001; F24F 2011/0046; F24F 2011/0058; H02J 3/14; Y02B 70/3225; Y02B 70/3275; Y04S 20/222; Y04S 20/244

USPC ........................................................ 700/275
See application file for complete search history.

(56) References Cited

U.S. PATENT DOCUMENTS

| 4,916,909 | A | * | 4/1990 | Mathur et al. ..................... 62/59 |
| 5,543,667 | A | * | 8/1996 | Shavit et al. ..................... 307/39 |
| 2002/0027131 | A1 | * | 3/2002 | Kitada ........................... 219/486 |
| 2009/0254225 | A1 | * | 10/2009 | Boucher ................ G06Q 30/02 700/295 |
| 2010/0204845 | A1 | * | 8/2010 | Ohuchi et al. ................. 700/291 |

OTHER PUBLICATIONS

Hammerstrom, DJ, et al., Pacific Northwest GridWiseTM Testbed Demonstration Projects, Part II. Grid FriendlyTM Appliance Project, Pacific Northwest National Laboratory, PNNL 17079, 2002.

Lu, N., et al., Control Strategies of Thermostatically Controlled Appliances in a Competitive Electricity Market, Proc. of 2005 IEEE PES General Meeting, San Francisco, California, 2005.

Schweppe, F. C., et al., Algorithms for a Spot Price Responding Residential Load Controller, IEEE Transactions on Power Systems, vol. 4, 1989, 507-516.

(Continued)

*Primary Examiner* — Mohammad Ali
*Assistant Examiner* — Yuhui R Pan
(74) *Attorney, Agent, or Firm* — A. J. Gokcek

(57) ABSTRACT

A system and method of controlling aggregated thermostatically controlled appliances (TCAs) for demand response is disclosed. A targeted load profile is formulated and a forecasted load profile is generated. The TCAs within an "on" or "off" control group are prioritized based on their operating temperatures. The "on" or "off" status of the TCAs is determined. Command signals are sent to turn on or turn off the TCAs.

23 Claims, 25 Drawing Sheets

(56) References Cited

OTHER PUBLICATIONS

Lu, N., et al., Grid FriendlyTM Device Model Development and Simulation, Pacific Northwest National Laboratory, PNNL 18998, 2009.

Henrir, M. H., et al., Power Management of Aggregate Electric Water Heater Loads by Voltage Control, Proc. IEEE Power Engineering Society General Meeting, 2007, 1-6.

Lu, N., et al., Design Considerations for Frequency Responsive Grid FriendlyTM Appliances, Proc. of the IEEE Transmission and Distribution Conference and Exposition, 2005, New Orleans, Louisiana.

Xiong, X., et al., A New Under-Frequency Load Shedding Scheme Considering Load Frequency Characteristics, Proc. of 2006 Int. Conf. on Power System Technol., 2006 1-4.

Chan, M. L., et al., An Integrated Load Management Distribution Automation and Distribution SCADA System for Old Dominion Electric Cooperative, IEEE Trans. on Power Delivery, 5, 1, 1990, 384-390.

Stitt, J. R., Implementation of a Large-Scale Direct Load Control System—Some Critical Factors, IEEE Trans. on Apparatus and Systems, 104, 7, 1985, 1663-1669.

McIntyre, J. M., et al., Distributed Intelligence in Load Control: Results of an Experiment Using Demand Limiting Devices for Residential Load Control, IEEE Trans. on Apparatus and Systems, 104, 5, 1985, 1140-1146.

Kondoh, J., et al., Ana Evaluation of the Water Heater Load Potential for Providing Regulation Service, IEEE Trans. on Power Systems, 99, 2011.

Callaway, D. S., Tapping the energy storage potential in electric loads to deliver load following and regulation, with application to wind energy, Energy Conversion and Management, 50, 2009, 1389-1400.

Parkinson, S., et al., Comfort-Constrained Distributed Heat Pump Management, Energy Procedia, 12, 2011, 849-855.

Wang, D. et al., Online voltage security assessment considering comfort-constrained demand response control of distributed heat pump systems, Applied Energy, 95, 2012, 104-114.

Du, P., et al., Appliance Commitment for Household Load Scheduling, IEEE Transactions on Smart Grid, 2, 2, 2011.

Lu, N., An Evaluation of the HVAC Load Potential for Providing Load Balancing Service, IEEE Trans. on Smart Grid, to be published.

Lu, N., Design Considerations of a Centralized Load Controller Using Thermostatically Controlled Appliances for Continuous Regulation Reserves, IEEE Trans. on Smart Grid, submitted for publication.

Lu, N., et al., An Evaluation of the Flywheel Potential for Providing Regulation Service in California, Proc. of the 2010 IEEE PES General Meeting, Minneapolis, MN, Jul. 2010.

Makarov, Y. V., et al., Operational Impacts of Wind Generation on California Power Systems, IEEE Transactions on Power Systems 24, 2, 2009.

Office of Energy Market Regulation, Federal Ener4gy Regulatory Commission, Revisions to the Amended and Restated Operating Agreement and PJM Open Access Transmission Tarrif, Docket No. ER11-4382-000, Washington D.C., Oct. 20, 2011, Available: http:/www.pjm.com/~/media/documents/ferc/2011-orders/20111020-er11-4382-000.ashx.

Warshay, B., Real-time demand regulation challenges traditional DR and energy storage, Smart Grid Newsletter, Dec. 27, 2011, Available: http:/www/smartgridnews.com.

Lu, N., et al., The Side-Area Energy Storage and Management System—Battery Storage Evaluation, Pacific Northwest National Laboratory, PNNL-18679, 2009.

Heffner, G., et al., Loads Providing Ancillary Services: Review of International Experience, Lawrence Berkeley National Laboratory Technical Report, LBNL-62701, ORNL/TM-2007/060, PNNL-16618, 2007.

Wang, D., et al., A Test Bed for Self-regulating Distribution Systems: Modeling Integrated Renewable Energy and Demand Response in the GridLAB-D/MATLAB Environment, IEEE ISGT2012, IEEE PES Conference on Innovative Smart Grid Technologies, Washington Marriott War4dman Park in the District of Columbia, 2012.

Lu, N., et al., A State-Queueing Model of Thermostatically Controlled Appliances, IEEE Transactions on Power Systems, 19, 3, 2004, 666-1673.

Andreolas, M., Mega Load Management System Pays Dividends, Transmission & Distribution World, Feb. 2004, 33-37.

Katipamula, S., et al., Evaluation of Residential HVAC Control Strategies for Demand Response Programs, ASHRAE Transactions, 1, 12, 2006, 1-12, Pacific Northwest National Laboratory, Richland, Washington, PNNL-SA-45954.

PJM Interconnection, LCC, Fast-Response Regulation Signal—Historical Raise/Lower Percentage, http://www.pjm.com/markets-and-operations/ancillary-services/mkt-based-regulation.aspx#RegSignal09 (accessed Jul. 22, 2011).

International Search Report/Written Opinion for International Application No. PCT/US2013/026177, International Filing Date Feb. 14, 2013, Date of Mailing Sep. 25, 2014.

\* cited by examiner

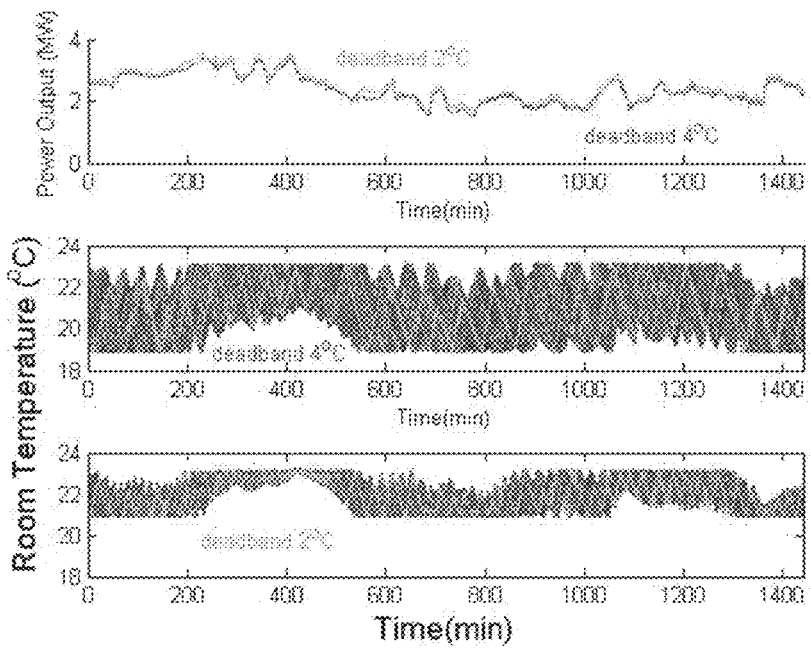
Figure 28A
Figure 28B
Figure 28C
Figure 28
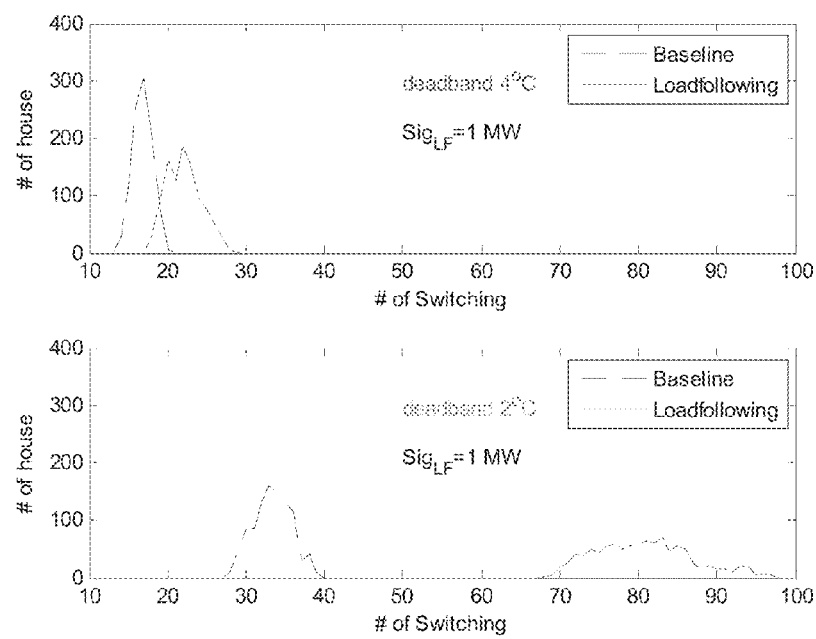
Figure 29A
Figure 29B
Figure 29

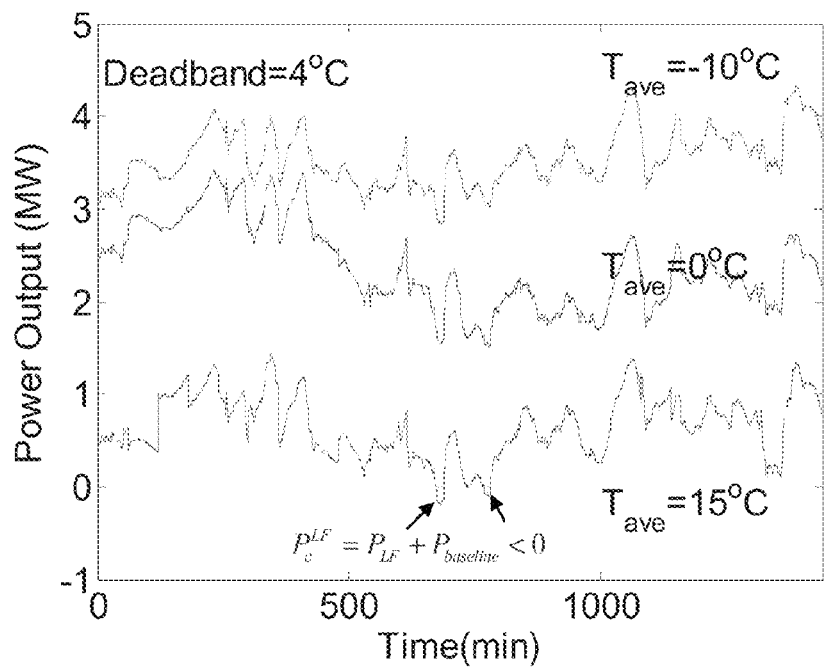
Figure 30
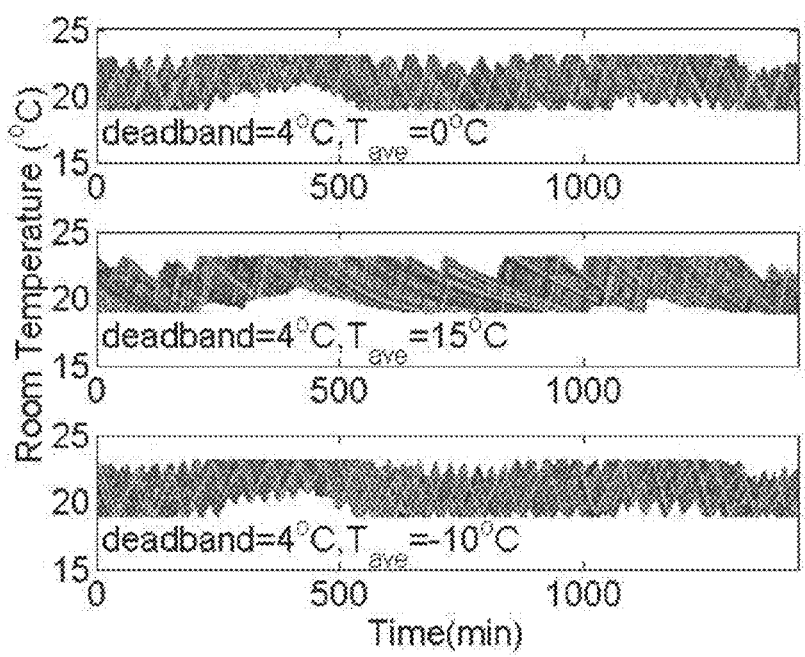
Figure 31A
Figure 31B
Figure 31C
Figure 31

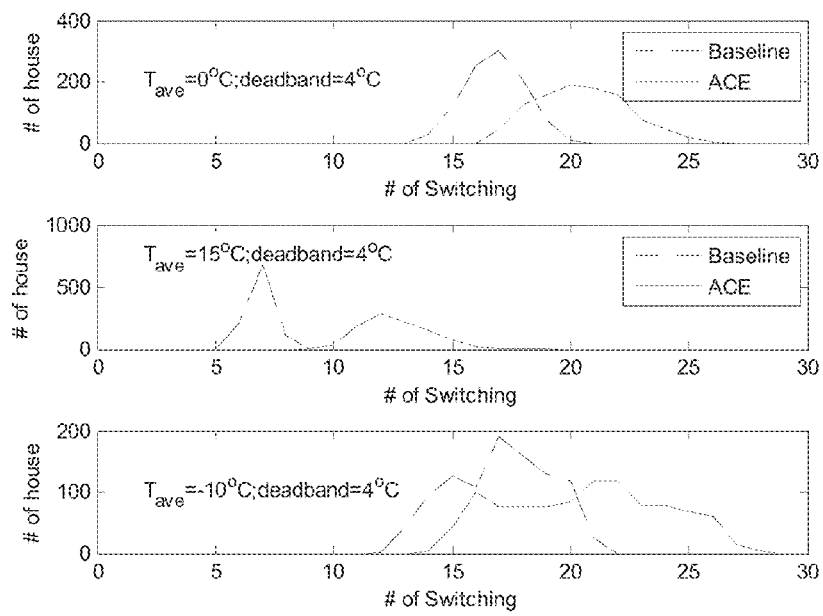
Figure 38A
Figure 38B
Figure 38C
Figure 38
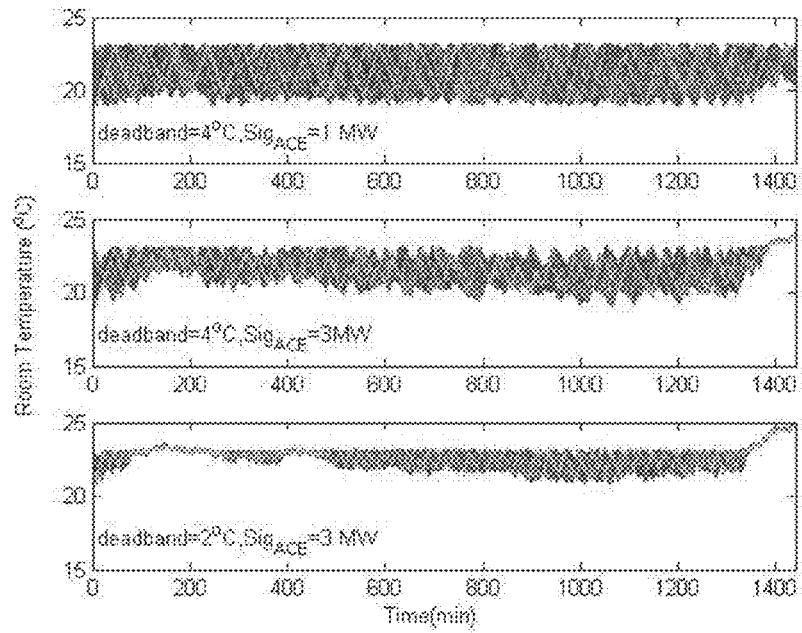
Figure 39A
Figure 39B
Figure 39C
Figure 39

CONTROLLER FOR THERMOSTATICALLY CONTROLLED LOADS

STATEMENT REGARDING FEDERALLY SPONSORED RESEARCH OR DEVELOPMENT

The invention was made with Government support under Contract DE-AC05-76RLO1830, awarded by the U.S. Department of Energy. The Government has certain rights in the invention.

TECHNICAL FIELD

This invention relates to demand response systems. More specifically, this invention relates to a method and system of controlling aggregated electrical loads with thermal energy storage capabilities.

BACKGROUND OF THE INVENTION

A major operational issue identified when integrating large amounts of intermittent renewable energy resources into a power grid is that both the ramp-rate and magnitude of continuous regulation reserves (CRRs), such as regulation and load following services, are expected to increase significantly. In meeting increased ramp and capacity requirements, the regulating generators, which, in the past, were the only source of such services, may be unable to operate close to their preferred operating points, resulting in lower efficiencies. Faster regulating movements also increase mechanical stress on these generators, shortening their lifetimes and increasing the wear-and-tear cost. Emerging energy resources, such as batteries, flywheels, and demand-side management (DSM), are flexible energy options that could provide the needed fast-response ancillary services. Of these options, DSM is the most underutilized for CRRs. This is because the fast regulating service should be available whenever needed; it should be fully controllable, observable, and measurable to become a product in ancillary service market. In addition, loads must be aggregated to the MW level to be practical to bid into the ancillary service market under current market rules. Nevertheless, since May 2006, markets for regulation service from DSM programs have opened in Pennsylvania, New Jersey, the Maryland Interconnection, and the PJM Interconnection LLC (PJM), although because of the strict telemetry requirement, all the participants of these programs have been large industrial customers so far.

The two-way communication network of the smart grid infrastructure enables flexible control of end devices from utility control centers. In general, there are two control methods in DSM: indirect load control (ILC) and direct load control (DLC). In ILC, the power consumption of loads is controlled by consumers or autonomously by end devices themselves. Control signals include electricity prices, system voltage, or system frequency deviation. For example, the set point control of thermostatically controlled appliances (TCAs) according to the real-time electricity tariff affects end users less than load shedding. However, the relationship between varying numbers of the external parameters (e.g., electricity tariffs) and power consumption is very complicated. Not only is the relationship nonlinear, but the power consumption may oscillate because of the lack of load diversity after the control is initiate. Therefore, ILC is not suitable to provide CRRs under current electricity market settings.

In DLC, the load is controlled directly by a utility or a system operator, making it possible to adjust the consumption precisely. Therefore, DLC has been selected in this study to demonstrate the applications of providing CRRs using TCAs. To gain customers' acceptance, the control implementation needs to be paid well and non-intrusive. Consumer can also override the centralized control when they no longer want to participate.

CRRs are high value ancillary services compared to peak shaving and load shifting. For example, the average bi-directional regulation price of the CAISO balancing authority is $11.95/MW (January-July, 2010) and that of the BPA balancing authority is $9.38/MW (2010). The regulation prices are expected to rise continuously when renewable penetration keeps increasing. Therefore, it is possible to generate financial incentives for consumer participation.

Technical challenges to design a DLC controller that meet CRR requirements include:
- When designing a central controller, one needs to consider the communication delays, errors, and bandwidth limitations.
- Operational characteristics of the TCAs should be taken into consideration. For example, the TCA lifetime shall not be shortened; the quality of its service shall not be significantly degraded; the safety and the comfort settings of the consumers shall not be tampered.
- The consumer override function should to be considered as a denial of service.
- The controller must be robust in order to tolerant the response delays and errors from the large amount of distributed TCA resources.

Callaway proposes a system identification approach based on Fokker-Planck diffusion models to design a direct control strategy to manage large populations of heating, ventilating, and air-conditioning (HVAC) units (See, D. S. Callaway, "Tapping the energy storage potential in electric loads to deliver load following and regulation, with application to wind energy," Energ. Convers. And Manag., Vol. 50 No. 9, pp. 1389-1400, 2009). An extended optimal centralized control strategy with comfort-constraints is proposed by Parkinson et al. (See, S. Parkinson, D. Wang, C. Crawford, and N. Djilali. "Comfort-constrained distributed heat pump management," Proc. of IEEE ICSGCE 2011, 2011); Wang et al. implemented this method on a simulation test bed to investigate the regulation and load shifting service supported by HVAC units to offset the intermittency of renewable resources in a self-regulating distribution system (See, D. Wang, B. de Wit, S. Parkinson, J. Fuller, D. Chassin, C. Crawford, N. Djilali, "A Test Bed for Self-regulating Distribution Systems: Modeling Integrated Renewable Energy and Demand Response in the GridLAB-D/MATLAB Environment," IEEE ISGT2012, IEEE PES Conference on Innovative Smart Grid Technologies, Washington Marriott Wardman Park in the District of Columbia, 2012). This control scheme requires sending a control signal to lower or raise thermostat setpoints of the HVACs based on an estimated probability density function of their on/off status and room temperatures. The drawback of controlling TCA thermostats is that the load diversity will be lost if thermostats of a group of TCA are raised or lowered frequently without coordination. In addition, the computation burden to identify aggregated TCA load dynamics is also challenging. The direct control of electric water heaters (EWHs) to adjust their power consumption to follow regulation signals has been investigated in (See, J. Kondoh, N. Lu, and D. J. Hammerstrom, "An Evaluation of the Water Heater Load Potential for Providing Regulation Service," IEEE Trans. on Power Systems, issue: 99, 2011). Because no resource prioritization is made in the approach, the EWHs being switched on or off may not be the optimal ones to be on or off. Therefore, over 10,000 EWHs were required to provide ±1 MW regulation services.

SUMMARY OF THE INVENTION

The present invention is directed to methods and systems of controlling aggregated thermostatically controlled appliances (TCAs) for demand response. In accordance with one embodiment of the present invention, the method includes formulating a targeted load profile; generating a forecasted load profile; prioritizing the TCAs within a "on" or "off" control group based on their operating temperatures; determining the "on" or "off" status of the TCAs; and sending command signals to turn on or turn off the TCAs.

In one embodiment, the method further includes monitoring the status of the TCAs on a periodic time interval schedule. The method can also include calculating the difference between the forecasted and targeted load profiles. The method can further include separating each TCA into the control groups.

In one embodiment, the generating a forecasted load profile further comprises forecasting a TCA operating status. The operating status includes "on" of "off" status and temperature. The generating a forecasted load profile further comprises generating a turn on/off list for the TCAs.

In one embodiment, the prioritizing the TCAs further comprises prioritizing a first "on" group in descending order to turn off the TCA in heating mode and a second "off" group in ascending order to turn on the TCA in the heating mode based on thermostat settings of the TCAs and/or room temperature.

In one embodiment, the prioritizing the TCAs further comprises prioritizing a first "on" group in ascending order to turn off the TCA in cooling mode and a second "off" group in descending order to turn on the TCA in the cooling mode based on thermostat settings of the TCAs and/or room temperature.

The TCAs comprise, but are not limited to, at least one of the following: heating, ventilation and air conditioning (HVAC) units, refrigerators, water heaters, coffee pots, rice cookers, thermostat cups, and electric hot bottle warmers.

In one embodiment, the method further comprises updating the on/off status, operating temperatures, and the load profiles based on actual measurements collected from the TCAs. The calculating a targeted load profile comprises generating a load profile based on historical data and temperature forecast information. The calculating a targeted load profile further comprises combining a baseline load with a control signal.

In one embodiment, the generating a forecasted load profile comprises obtaining previous operating temperature and on/off status information of the TCAs.

In another embodiment of the present invention, a system for controlling thermostatically controlled appliances (TCAs) is disclosed. The system comprises a two-way communication network between a controller and the TCAs. The controller formulates a targeted load profile and a forecasted load profile, wherein the controller prioritizes the TCA within an "on" control group or an "off" control group, determines the "on" or "off" status of the TCAs, and sends command signals to turn on or turn off the TCAs.

In one embodiment, the controller monitors the status of the TCAs on a periodic time interval schedule. In another embodiment, the controller calculates the difference between the forecasted and targeted load profiles. In another embodiment, the controller separates each TCA into the control groups. The controller can also forecast a TCA operating status. The operating status includes "on" or "off" status and temperature. The controller also generates a turn on/off list for the TCAs.

In one embodiment, the controller prioritizes a first "on" group in descending order to turn off the TCA in heating mode and a second "off" group in ascending order to turn on the TCA in the heating mode based on thermostat settings of the TCAs and/or room temperature.

In one embodiment, the controller prioritizes a first "on" group in ascending order to turn off the TCA in cooling mode and a second "off" group in descending order to turn on the TCA in the cooling mode based on thermostat settings of the TCAs and/or room temperature.

In another embodiment, the controller updates the on/off status, operating temperatures, and the load profiles based on actual measurements collected from the TCAs. The controller also generates a load profile based on historical data and temperature forecast information.

In another embodiment, the controller combines a baseline load with a control signal. The controller also obtains previous operating temperature and on/off status information of the TCAs.

In another embodiment of the present invention, a demand response system is disclosed. The system includes a centralized controller, indirectly controlled loads, and directly controlled loads. The controller sends a primary response signal to the indirectly controlled loads as a primary response and a secondary response signal to the directly controlled loads to compensate for discrepancies between targeted and actual output results of the primary response.

In one embodiment, the directly controlled loads and the indirectly controlled loads comprises TCAs.

In one embodiment, the TCAs of the directly controlled loads are prioritized within an "on" or "off" control group based on their operating temperatures. In another embodiment, the status of the TCAs of the directly controlled loads are determined and monitored on a periodic time interval schedule.

In one embodiment, a first "on" group of the directly controlled TCAs are prioritized in descending order to turn off the TCA in heating mode and a second "off" group in ascending order to turn on the TCA in the heating mode based on thermostat settings of the TCAs and/or room temperature. In another embodiment, a first "on" group of the directly controlled TCAs are prioritized in ascending order to turn off the TCA in cooling mode and a second "off" group in descending order to turn on the TCA in the cooling mode based on thermostat settings of the TCAs and/or room temperature.

In one embodiment, the on/off status, operating temperatures, and load profiles of the directly controlled TCAs are updated based on actual measurements collected from the TCAs.

In another embodiment of the present invention, a method of controlling indirectly controlled and directly controlled loads in a demand response system is disclosed. The method includes sending a primary response signal to the indirectly controlled loads as a primary response, and sending a secondary response signal to the directly controlled loads to compensate for discrepancies between targeted and actual output results of the primary response.

BRIEF DESCRIPTION OF THE DRAWINGS

FIGS. 28A-C are graphs illustrating the impact of different dead bands on room temperature profiles.

FIGS. 29A-B are graphs illustrating the impact of dead bands on HVAC daily cycles.

FIG. 30 is a graph illustrating the impact of outdoor temperatures on control signal following capabilities.

FIGS. 31A-C are graphs illustrating the impact of outdoor temperatures on room temperature profiles.

FIGS. 38A-C are graphs illustrating the impact of different outdoor temperature profiles on the HVAC daily operation.

FIGS. 39A-C are graphs illustrating examples of out-of-capacity cases.

DETAILED DESCRIPTION OF THE PREFERRED EMBODIMENTS

Figure 1:
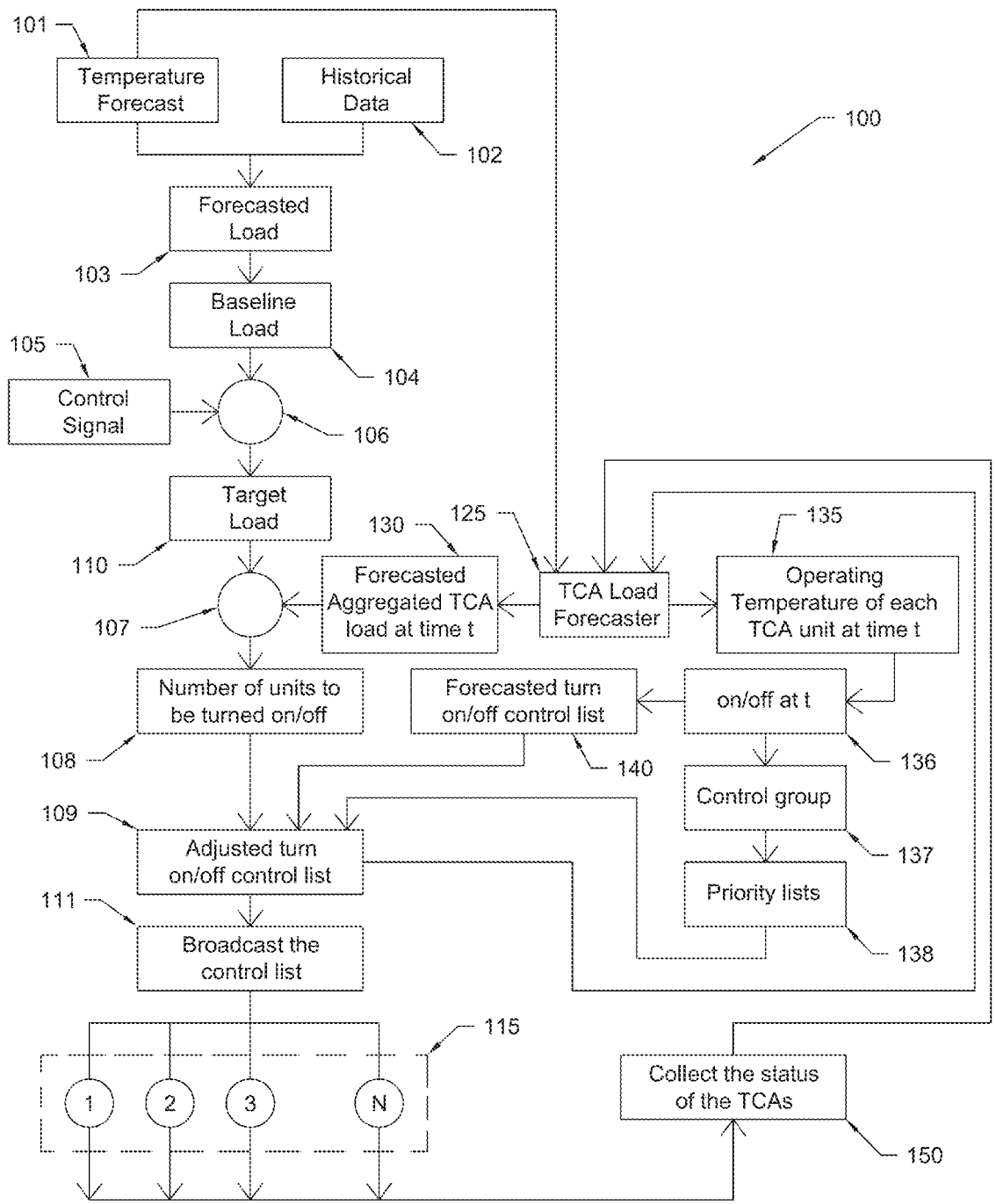
FIG. 1 is a data flow diagram of direct load control logic for controlling thermostatically controlled appliances (TCAs), in accordance with one embodiment of the present invention.

The present invention is directed to systems and methods of controlling aggregated thermostatically controlled appliances. FIG. 1 is a data flow diagram 100 of direct load control logic for controlling thermostatically controlled appliances (TCAs), in accordance with one embodiment of the present invention. At 101 and 102, a load profile is generated based on historical data 102 and temperature forecast information 101, which generates a forecasted load profile at 103. At 104 and 105, a targeted baseline load 110 is generated by combining a baseline load 104 and a control signal 105 at 106.

The temperature forecast 101 is also used to generate, in part, a load forecaster 125 for the thermostatically controlled appliances (TCAs). The load forecaster 125 also receives on/off status of the TCAs at certain time steps 150 and the adjusted turn/off control list 109. The load forecaster 125 is used to generate a forecasted load at time 't' at 130 and a TCA operating status, which includes the temperatures of the TCAs at time t, at 135. The temperatures of the TCAs at time 't' at 135 are used to determine the on/off status at time 't' at 136, separate each TCA into control groups at 137, and to create a priority list of the TCAs at 138. The on/off status at time 't' at 136 is used to generate a forecasted turn on/off control list at 140.

At 107, the difference between the forecasted and the targeted load profiles are calculated. This calculated difference between the forecasted and targeted load profiles is used to determine the number of units to be turned on or off at 108. The number of units to be turned on or off at 108, the forecasted turn on/off control list 140, and the priority list 138 are used to generate an adjusted turn on/off control list at 109. At 111, command signals are sent to turn on or turn off the TCAs 115. The status of the TCAs is also monitored at 150 on a periodic time interval schedule. For example, the TCAs can be monitored every 5, 10, 15, or 20 minutes.

Figure 2:
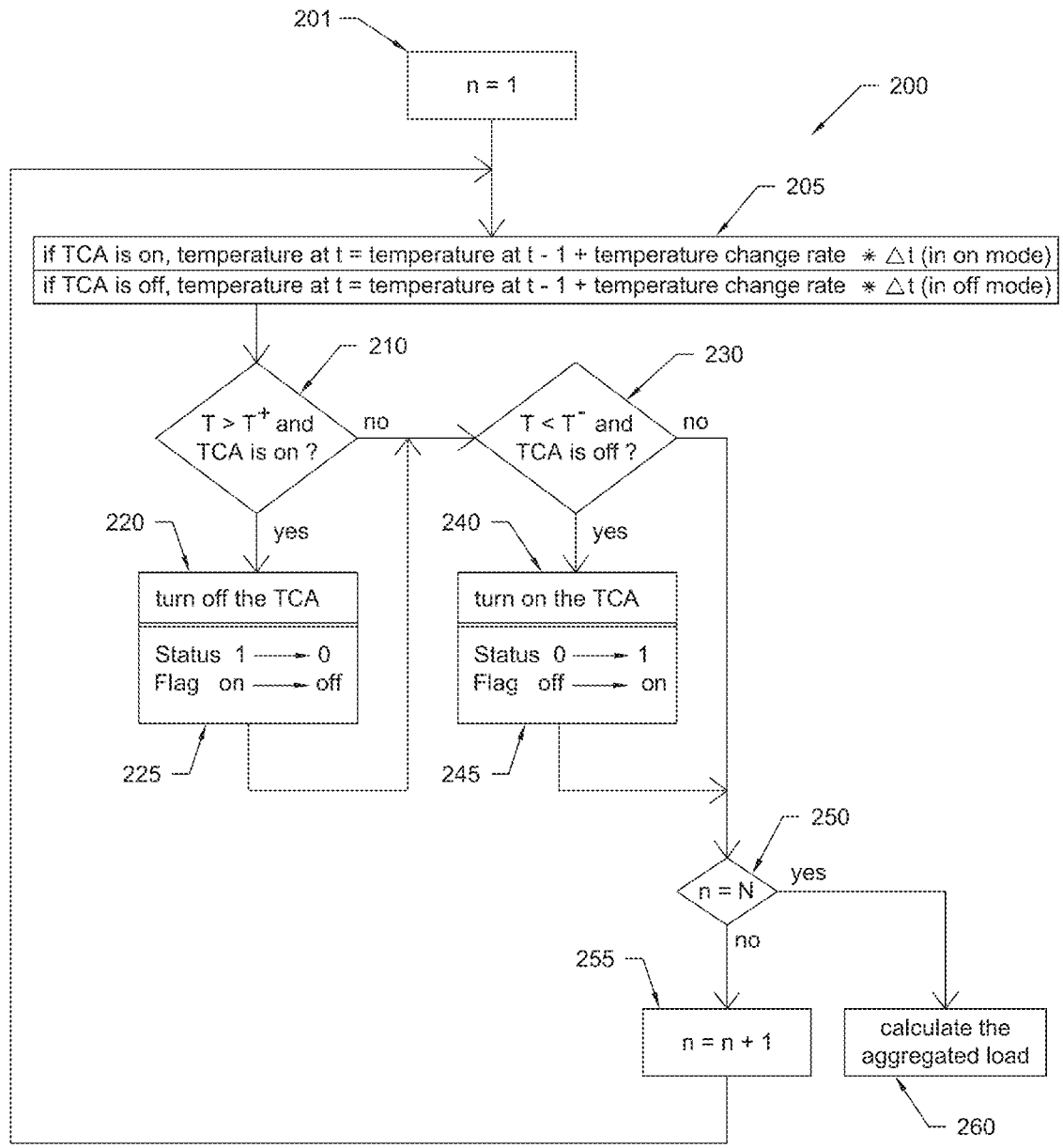
FIG. 2 is a data flow diagram showing forecaster functionality in heating mode for forecasting the aggregate TCA load at a certain time interval and determining the operating temperature of each TCA load, in accordance with one embodiment of the present invention.

FIG. 2 is a data flow diagram 200 showing forecaster functionality in heating mode for forecasting the aggregate TCA load at a certain time interval and determining the operating temperature of each TCA load, in accordance with one embodiment of the present invention. For n=1 at 201, if the TCA is on the temperature at time 't' is equal to the temperature at t−1+a temperature change rate×ΔT (in on mode), as shown at 205. If the TCA is off, the temperature at time 't' is equal to the temperature at t−1+a temperature change rate× ΔT (in off mode), as shown at 205 The temperature change rates in 205 are determined by the temperature forecast 101 (FIG. 1). If at 210, it is determined if the temperature 'T' of the TCA is greater than a setpoint temperature 'T$^t$' and if the TCA is operating or in "on" mode. If so, then at 220, the TCA is turned off and, at 225, the status of the TCA is changed from on or '1' to off or '0' and the flag is changed from on to off. Once that is complete, proceed to 230. If at 210, T is not greater than T$^t$, then it is determined at 230 if T is less than T$^-$ and if the TCA is not operating or in "off" mode. If so, then at 240, the TCA is turned on and, at 245, the status of the TCA is changed from off or "0" to on or "1" and the flag is changed from off to on. Once that is complete, proceed to 250. If, however, T is not less than T$^-$ and the TCA is not off, then it is determined if unit n is equal to the last unit N to be controlled. If so, then the aggregated load is calculated at 260. If not, then the status of the next unit, e.g., n+1, is determined and changed, if necessary.

Figure 3:
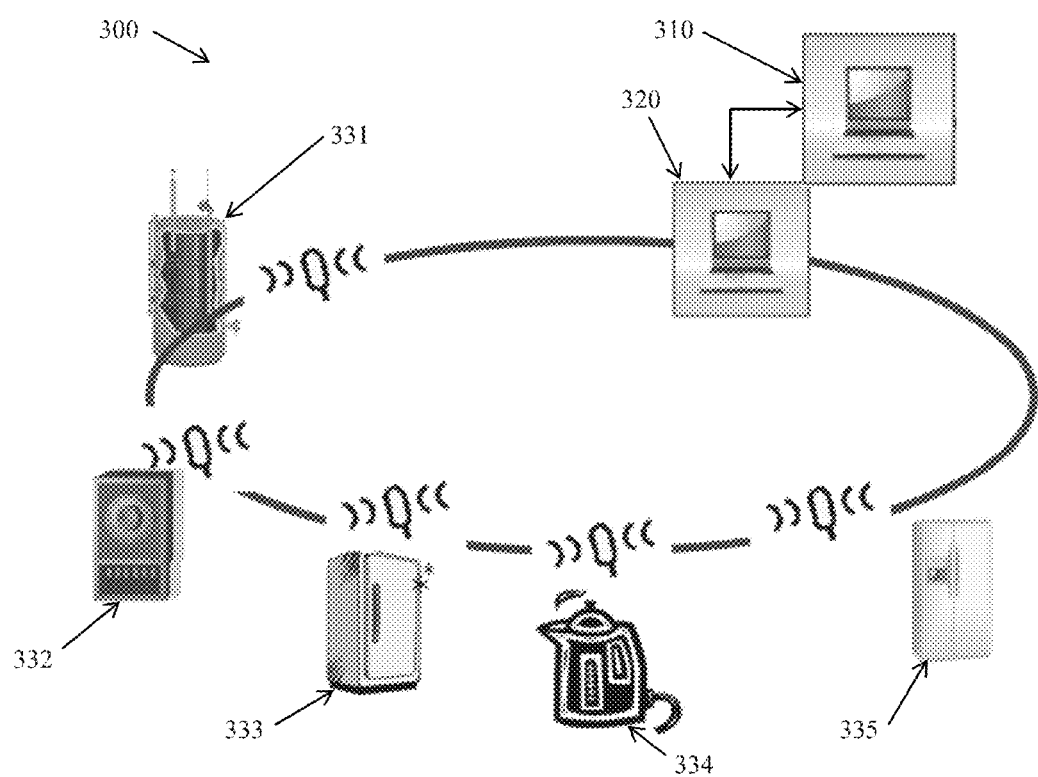
FIG. 3 is an illustration showing a communication network between at least one controller and the TCAs, in accordance with one embodiment of the present invention.

FIG. 3 is an illustration showing a communication network 300 between at least one controller and the TCAs, in accordance with one embodiment of the present invention. Loads with thermal storage capability include different types of TCAs, such as hot water heaters 331, air conditioners (a/c) 332, freezers 333, hot water bottles 334, and a fridge 335. Each TCA 331-335 is a thermal cell that stores electricity as thermal energy within an operating temperature range, similar to the high and low water levels in a reservoir. A centralized controller 320 controls the times of each thermal cell's electrical energy consumption. The centralized controller 320 can be housed in a substation, building, high-rise building, or in a community energy storage center. A Utility energy management system (EMS) controller 310 is shown in communication with the centralized controller 320. The centralized controller 320 and the EMS controller 310 can be replaced with a single controller.

Figure 4:
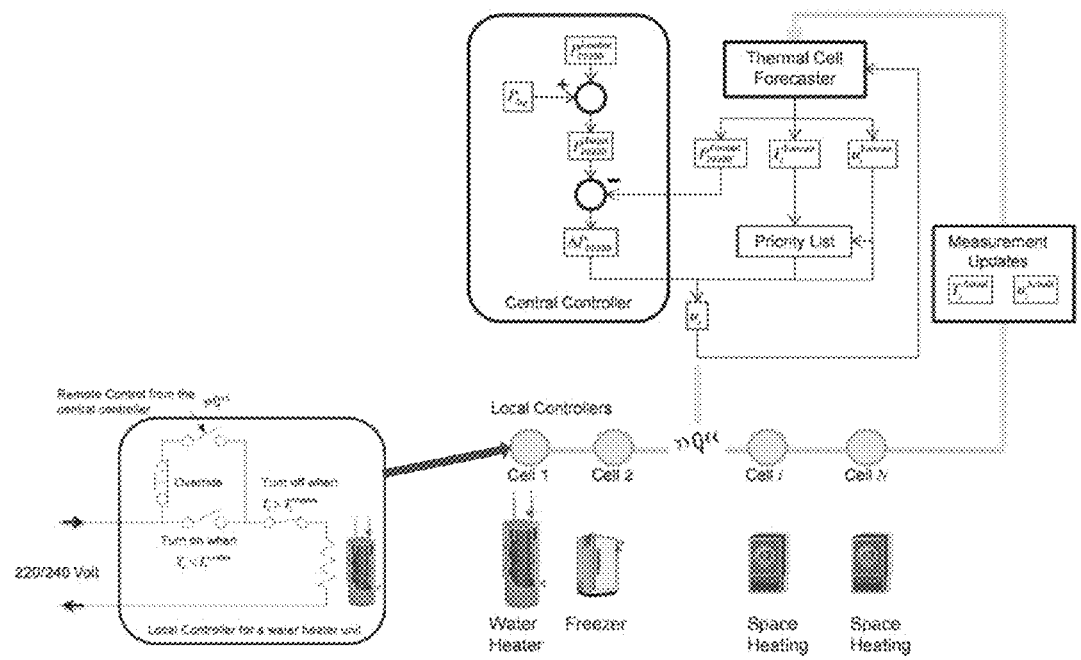
FIG. 4 is a data flow diagram illustrating components and direct load control logic of a controller for controlling the TCAs, in accordance with another embodiment of the present invention.

FIG. 4 is a data flow diagram illustrating components and direct load control logic of a passive electrical energy storage system (PEESS) for controlling the TCAs, in accordance with another embodiment of the present invention. At each time step, the centralized controller receives a control signal, $P_{sig}$, and superimposes it on $P_{PEESS}^{Baseline}$ to get a target power output, $P_{PEESS}^{Target}$, at time t. The thermal cell forecaster will forecast the cell operating temperature, $T_i^{Forecast}$, and determine the cell on/off status, $u_i^{Forecast}$. Then, the forecaster calculates the forecast power output, $P_{PEESS}^{Forecast}$, at t. The difference between $P_{PEESS}^{Target}$ and $P_{PEESS}^{Forecast}$ will determine how many additional cells will need to be turned on or off based on a priority list to make $P_{PEESS} = P_{PEESS}^{Target}$ and adjust $u_i^{Forecast}$ to $u_i$. The forecaster will adjust its forecasts based on real measurements received from each thermal cell every k time steps.

The local thermal cells can be controlled remotely by a circuit. If, for example, a consumer wants to make sure his comfort will not be compromised, he can make the remote control settings $[T_i^{on}\ T_i^{off}]$ or $[T_i^{off}\ T_i^{on}]$, depending on whether the appliance is in heating or cooling mode, within $[T_i^{Lowlim}\ T_i^{Highlim}]$. An override button can also disable the remote control of the thermal cell. With override, the TCAs are controlled by local settings. For example, the TCAs are turned on when their temperatures fall below $T_i$. Likewise, the TCAs are turned off when their temperatures are above $T_i$.

Figure 5:
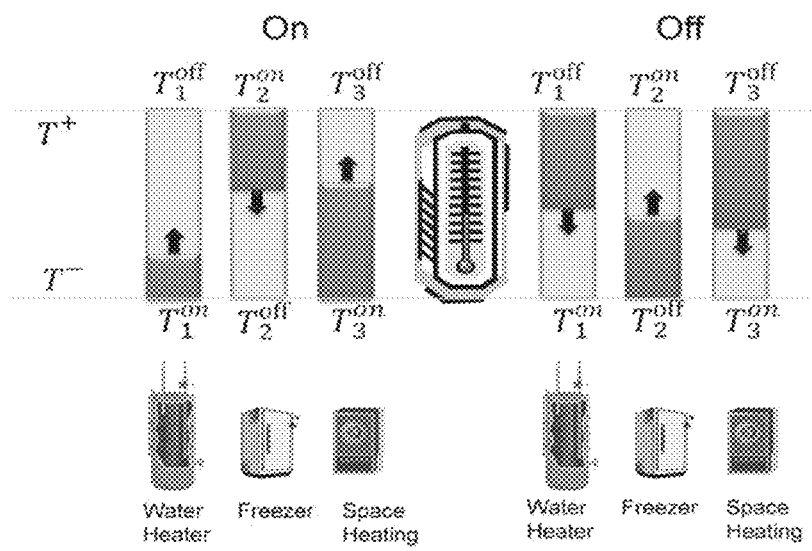
FIG. 5 is an illustration of operating status for the TCAs, in accordance with one embodiment of the present invention.

FIG. 5 is an illustration of thermal cell settings 500 for the TCAs, in accordance with one embodiment of the present invention. As shown in FIG. 5, if a cell is in heating mode, $T_i^{on}$ is the upper temperature limit, $T^+$, while $T_i^{off}$ is the lower temperature, $T^-$. If a cell is in cooling mode, $T_i^{off}$ is $T^+$, while $T_i^{on}$ is $T^-$.

To improve resource utilization and increase control efficiency, a temperature priority list method is described to prioritize each TCA based on how close it is to be turned on or off. In one embodiment, a simplified TCA model is applied at the central controller to forecast TCA behaviors on a per-minute basis; the forecasts will be corrected by measurements obtained from the advanced metering infrastructure (AMI) every 10-20 minutes or so, as one example. Thus, the controller will broadcast control signals at the actual control interval, e.g., every minute but will collect monitoring signals from each TCA every 15 minutes. (It should be noted that the exact intervals listed herein are example approximations and can vary according to system needs.) By doing so, the communication and computation burdens will be greatly reduced. The central controller controls the on and off of each TCA load while maintaining its temperature within desired ranges. Our simulation results showed that:

The number of TCAs required for 1MW CRR is significantly reduced.

Customer comfort is not compromised significantly.

Load diversity is preserved.

Modeling Methodologies

Figure 6:
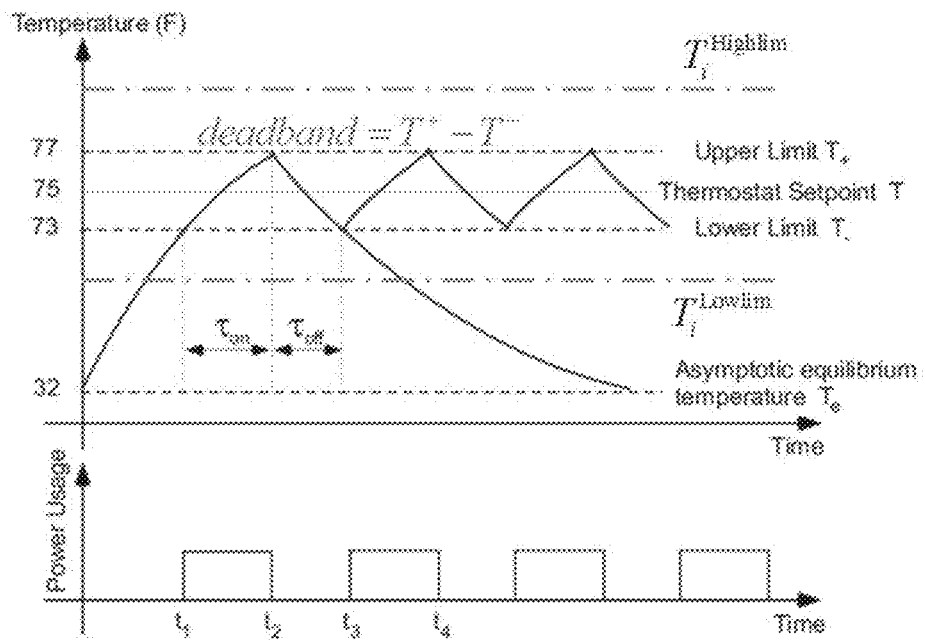
FIG. 6 is a graph illustrating behavior of an HVAC unit.
Figure 7:
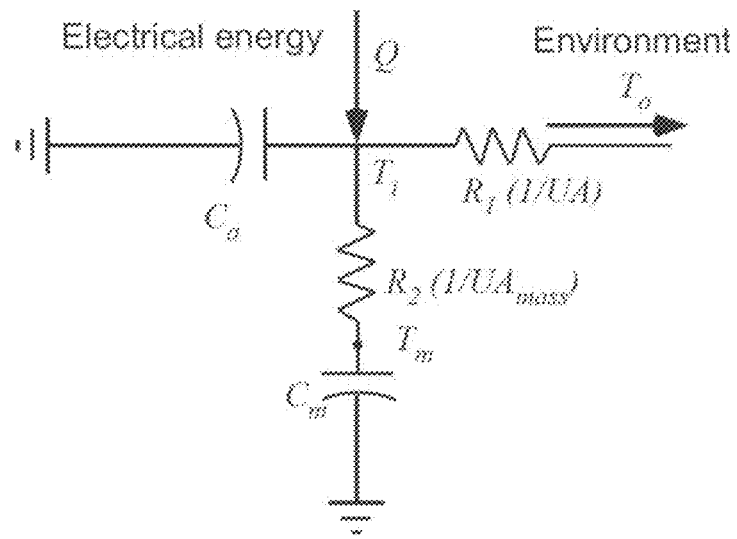
FIG. 7 is an illustration of an equivalent thermal parameters (ETP) model of a residential HVAC unit.

The HVAC load is used to illustrate the control algorithm development. To model the electricity consumption of an HVAC unit, the unit's heat transfer process is modeled as shown in FIG. 6, considering ambient temperature changes. This section introduces the thermal dynamic equations.

A. Thermal Dynamics Models of an HVAC Unit

An equivalent thermal parameters (ETP) model of a residential HVAC unit is shown in 7.

$C_a$—air heat capacity (Btu/° F. or J/° C.)
$C_m$—mass heat capacity (Btu/° F. or J/° C.)
Q—heat rate for HVAC unit (Btu/hr or W)
UA—standby heat loss coefficient (Btu/° F.·hr or W/° C.)
$R_1$—1/UA
$R_2$—1/UA$_{mass}$
$T_o$—ambient temperature (° F. or ° C.)
$T_i$—air temperature inside the house (° F. or ° C.)
$T_m$—mass temperature inside the house (° F. or ° C.)

A state space description of the ETP model is:

$$\dot{x} = Ax + Bu \quad (1)$$

$$y = Cx + Du$$

$$\dot{x} = \begin{bmatrix} \dot{T}_i \\ \dot{T}_m \end{bmatrix} \quad x = \begin{bmatrix} T_i \\ T_m \end{bmatrix} \quad u = 1$$

$$A = \begin{bmatrix} -\left(\dfrac{1}{R_2 C_a} + \dfrac{1}{R_1 C_a}\right) & \dfrac{1}{R_2 C_a} \\ \dfrac{1}{R_2 C_m} & -\dfrac{1}{R_2 C_m} \end{bmatrix}$$

$$B = \begin{bmatrix} \dfrac{T_0}{R_1 C_a} + \dfrac{Q}{C_a} \\ 0 \end{bmatrix}$$

$$C = \begin{bmatrix} 1 & 0 \\ 0 & 1 \end{bmatrix} \quad D = \begin{bmatrix} 0 \\ 0 \end{bmatrix}$$

The detailed model can be simplified by considering an equivalent model that matches the measured turn-on time, $t_{on}$, and turn-off time, $t_{off}$, under a range of ambient temperatures, $T_o$.

When $T_{room} < T^+$, the heater is turned off $$T_{room}^{t+1} = T_o^{t+1} - (T_o^{t+1} - T_{room}^t)e^{-\frac{\Delta t}{RC}} \quad (2)$$

When $T_{room} > T^-$, the heater is turned on $$T_{room}^{t+1} = T_o^{t+1} + QR - (T_o^{t+1} + QR - T_{room}^t)e^{-\frac{\Delta t}{RC}} \quad (3)$$

$T_{room}$—room temperature (° C.)
C—equivalent heat capacity (J/° C.)
R—equivalent thermal resistance (° C./W)
Q—equivalent heat rate (W)
t—time (minute)
$\Delta t$—time step (1 minute)
$T_o$—ambient temperature (° C.)

Because the room temperature variation is controlled within a narrow temperature band of 2-4° C., the simplified model produces satisfactory results and significantly speeds up the forecasting process required to create the temperature priority list for a large number of HVAC units in seconds.

Figure 8A:
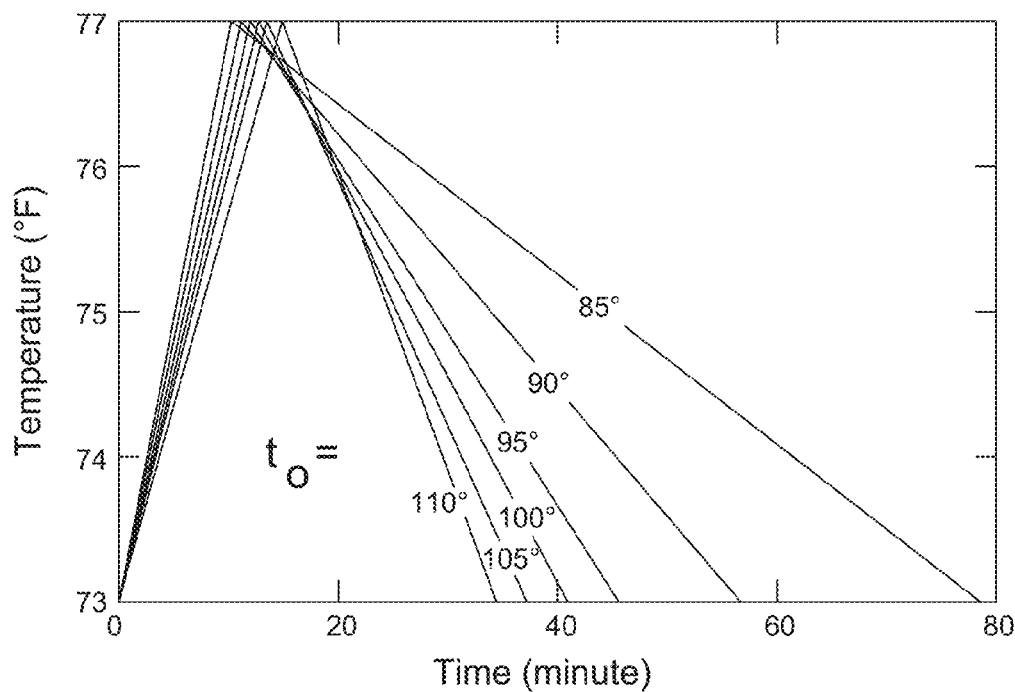
FIGS. 8A and 8B are graphs illustrating room temperature profiles and on and off durations of an HVAC in its cooling mode under different outdoor temperatures.
Figure 8B:
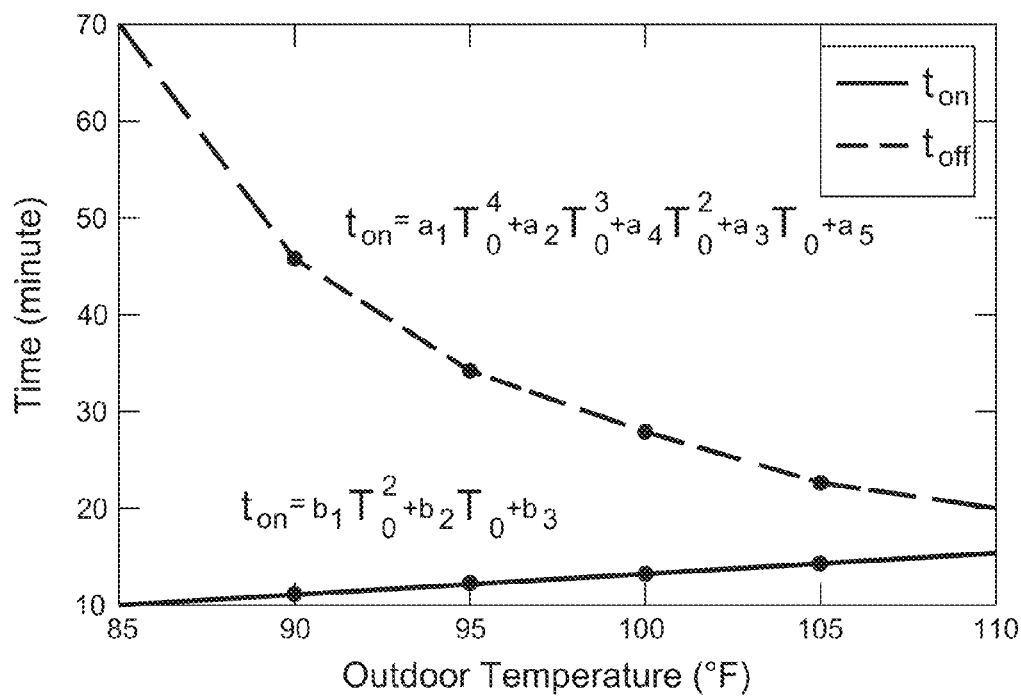

As described in Eq. (4)-(8), a further simplification of Eq. (2) and (3) is to use linearized turn on and turn off curves to forecast the TCA temperature. FIGS. 8A and 8B are graphs illustrating room temperature profiles and on and off durations of an HVAC in its cooling mode under different outdoor temperatures. As shown in FIGS. 8A and 8B, $t_{on}$ and $t_{off}$ of an HVAC in its cooling mode is a function of $T_o$; therefore, they can be easily calculated using Eq. (4)-(6). Then, one can calculate the temperature changes using Equation (7) and (8).

$$T_{deadband} = T^+ - T^- = 2(T^+ - T_{set}) \quad (4)$$

$$t_{off} = a_1 T_o^4 + a_2 T_o^3 + a_3 T_o^2 + a_4 T_o + a_5 \quad (5)$$

$$t_{on} = b_1 T_o^2 + b_2 T + b_3 \quad (6)$$

$$T_{room}^{t+1} = T_{room}^t - \frac{T_{deadband}}{t_{off}} \Delta t \quad (7)$$

$$T_{room}^{t+1} = T_{room}^t + \frac{T_{deadband}}{t_{off}} \Delta t \quad (8)$$

$a_i$—curve fitting parameters
$b_i$—curve fitting parameters
$T^+$—upper temperature limit (° C.)
$T^-$—lower temperature limit (° C.)
$T_{deadband}$—difference between upper and lower temperature limits (° C.)

During our simulation, each individual HVAC unit is modeled using the detailed model described by Eq. (1). The forecaster located in the central controller uses one of the two simplified methods. The linearized model is easier to derive based on measurement data than the exponential model but it requires more parameters to calculate variations in cycling durations brought by ambient temperature changes.

1000 HVAC units (rated at 6 kW) in their heating modes are modeled to illustrate the algorithm and the control mechanism. Customer thermostat settings, $T_{set}$, are set at 21° C. Set $T^+$ to be 23° C. and $T^-$ to be 19° C., then, $T_{deadband}$ is 4° C. The mean values of C, R, and Q are set to 3599.3 J/° C., 0.1208° C./W, and 400 W, respectively. Note that parameters, R, C, and Q are curve fitting parameters that fit the performance curve produced by the precise physical model represented by Eq. (1) or by measurements. The R, C, and Q parameters are randomized for different HVAC units to create load diversity. An initialization process is used to set the initial room temperature and randomize the on and off status of each HVAC unit.

B. Set Up the HVAC Baseline Output

An aggregated baseline output of the HVAC units, must be provided to grid operators so that deviations from the baseline output can be measured as CRRs (e.g., regulation up and down services or load following up and down services).

Figure 9:
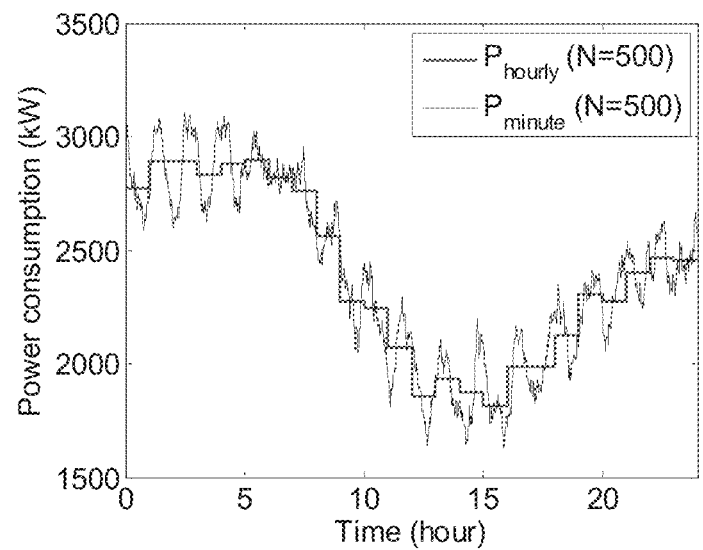
FIG. 9 is a graph illustrating HVAC baseline loads.
Figure 10:
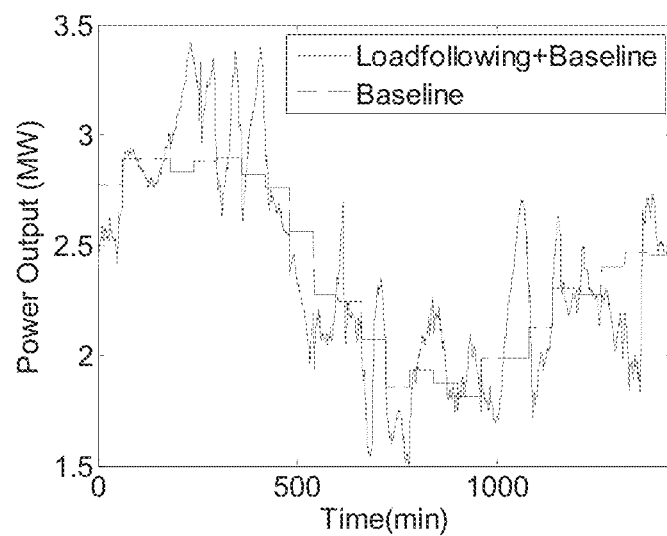
FIG. 10 is a graph illustrating baseline loads and control signals for HVAC units.

To create a baseline load, all participating HVAC units are modeled in an uncontrolled mode using next-day outdoor temperature forecasts. The uncontrolled model means that HVAC thermostats turn the HVAC units on and off. Then, the aggregated HVAC power output is averaged to an hourly load profile as the day-ahead $P_{baseline}$, as shown in FIG. 9. Note that the baseline load profiles vary with outdoor temperatures, different thermostat settings, and different numbers of controlled HVAC units. In general, more HVAC units and wider dead band settings provide greater load balancing capacity.

C. Set-Up the Control Signal

Load following signals are scaled to 1-minute signals and normalized to ±1 MW for a baseline load constructed by 1000 controlled HVAC units. The control signal, $P_c^{LF}$, is calculated as:

$$P_c^{LF} = P_{baseline} + P_{LF} \quad (9)$$

An example of the control signal for controlling the 1000 HVAC units for ±1 MW load following is shown in 10.

Control Algorithms

Figure 11:
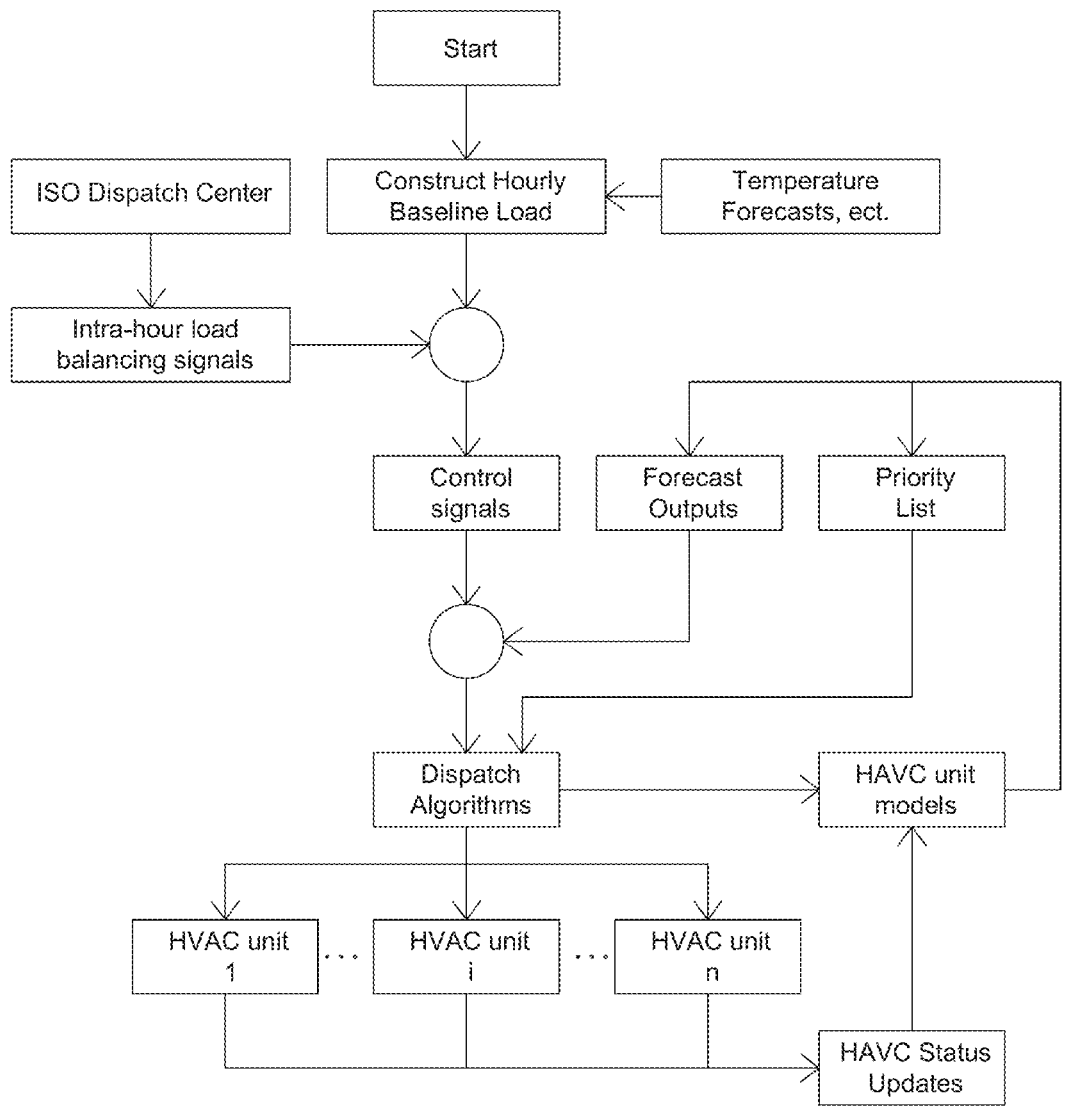
FIG. 11 is a flow chart of direct load control logic for controlling HVAC units, in accordance with one embodiment of the present invention.

A flow chart of the direct load control logic is provided in FIG. 11. In this embodiment, the steps are to group and prioritize resources based on forecaster results. Before the controller starts the dispatch algorithm, all the controllable HVAC units are first divided into two groups based on their forecasted on/off status. As space heating units are used for demonstration purposes, the units in the "on" group are prioritized in descending order based on their room temperatures, i.e., if the room temperature is closer to the upper thermostat setting $T^+$, the unit is at the top of the queue to be turned off. The units in the "off" group are prioritized in ascending order based on their room temperatures, i.e., if the room temperature is closer to the lower thermostat setting $T^-$, the unit is at the top of the queue to be turned on. The HVAC units that are "on" under direct load control will switch off immediately when they receive an "off" signal from the central controller, and vice versa.

Figure 12:
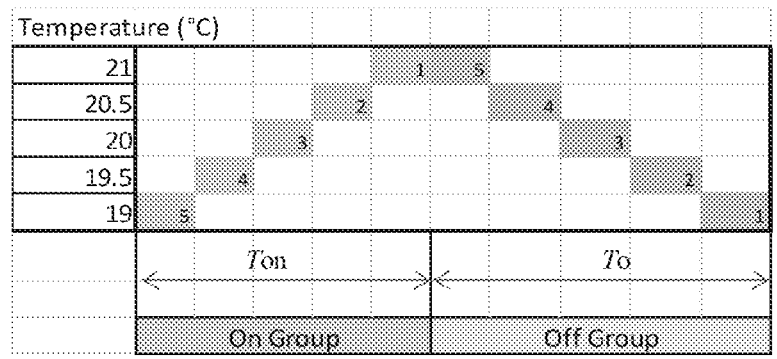
FIG. 12 is an illustration of a priority group list for prioritizing the TCAs in ascending and/or descending order based on their on/off status, in accordance with one embodiment of the present invention.

FIG. 12 is an illustration of a priority group list for prioritizing the TCAs in ascending and/or descending order based on their on/off status, in accordance with one embodiment of the present invention. As shown in 12, if all HVAC units are grouped into five "on" states and five "off" states, then those units in State 1 will have the highest priority to be used. This is because if we turn off an "on" HVAC unit (e.g. a unit in State 1), which is close to $T^+$ (21° C.), it will stay longer in the "off" queue compared with another "on" unit (e.g. a unit in State 5), which was just turned on. It is an optimal way of utilizing the "on" HVAC resources compared with sending an "off" command to a random HVAC unit in the "on" group.

Figure 13:
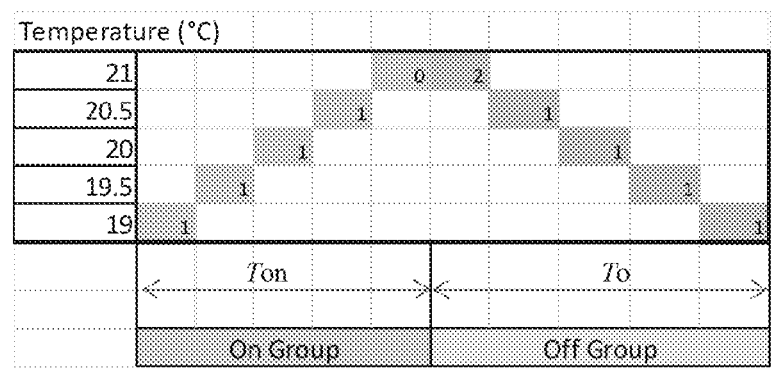
FIG. 13 is an illustration on the state evolution at t+1 using temperature priority list method, where the number in each block represents the numbers of units in that state, in accordance with one embodiment of the present invention.

Another advantage of this control mechanism is that it has minimum impact on load diversities. Assuming there is one HVAC unit in each state at time t and one HVAC unit should be turned off FIG. 13 is an illustration on the state evolution at t+1 using temperature priority list method, where the number in each block represents the numbers of units in that state, in accordance with one embodiment of the present invention. As show in FIG. 13, at t+1, if we use temperature priority list and control the on/off of the HVAC unit directly, there is only one state with zero population and one state with an increased number of population among all the 10 states.

Figure 14:
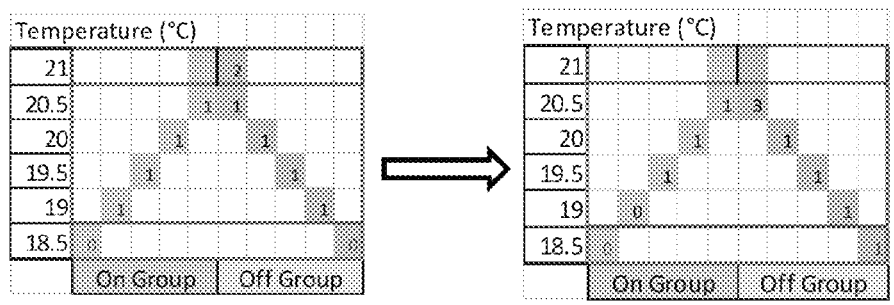
FIG. 14 is an illustration of the state evolution from t+1 to t+2 when shifting the thermostat setpoint down by 0.5° C. in a traditional demand response program.

Traditionally, people shift the thermostat setpoint for demand response. The disadvantages of that include the following: 1. to create the same response by shifting the thermostat setpoint down 0.5° C., there will be two states with zero population and one with tripled population, as shown in FIG. 14, and 2. it is difficult to turn on/off exactly n HVAC units because the number of units in the temperature shifting range may be either less or greater than n. Therefore, if controllable HVAC outputs are desired, controlling the on/off of the HVAC unit should be used instead of shifting its thermostat setpoint.

Figure 15:
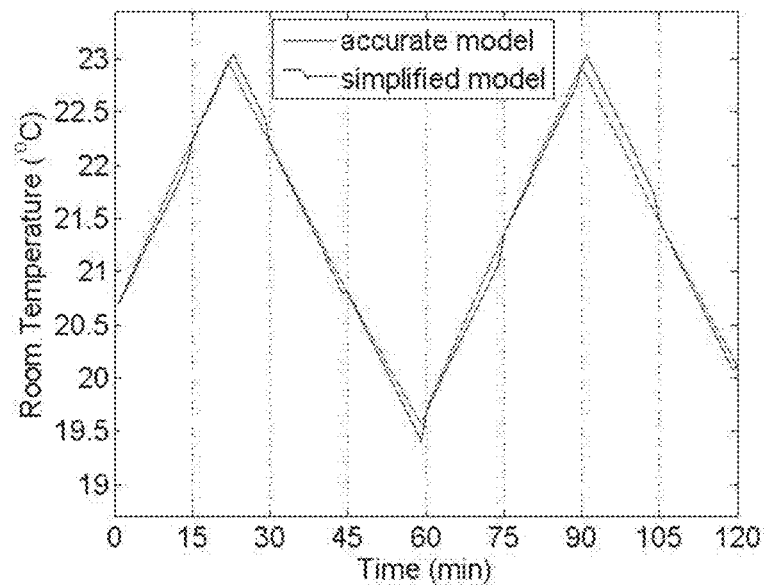
FIG. 15 is a graph illustrating room temperature profiles of an HVAC unit in heating mode.

The forecaster is used to estimate room temperatures of the HVAC units for the next time step, determine the on/off status of the HVAC units, and create two priority lists, turn-on and turn-off, for the two groups of HVAC units. The forecasts, $T_f^{HVAC}$, can be tuned and corrected based on actual measurement, $T_a^{HVAC}$, collected from HVAC units about every 15 minutes. The forecaster can use a simplified HVAC thermal model as described above. An update process can be seen in FIG. 15, which illustrates room temperature profiles of an HVAC unit in heating model (modeled by Eq. (2) and Eq. (3) and tuned by measurements). This forecast-and-update process will reduce the amount of data traffic from each controlled HVAC unit to the central controller.

Modeling Results

Figure 16:
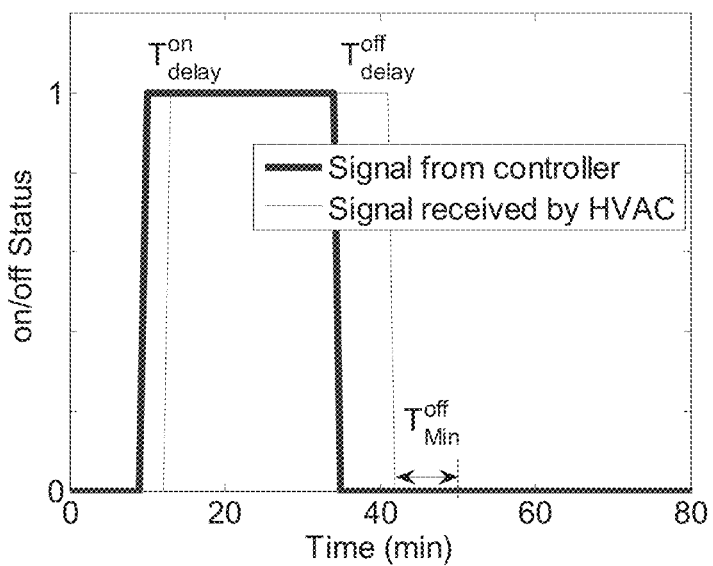
FIG. 16 is a graph illustrating response delays and minimum turn off time when an HVAC unit is turned off.

In the base case, the central controller receives room temperature measurements at each time step with no communication delays in sending control commands or receiving monitoring data. In addition, the HVAC units respond to control command immediately with zero turn on/off delays. This assumption is made to explore the full potential of the HVACs to provide CRR services when the central controller has precise information and instantaneous control of each HVAC unit. Then, a number of factors that may limit the capability of the HVAC load for CRR services are simulated. First, the impact of the update-by-measurement process is modeled in the imperfect forecast case. When an HVAC unit is turned off, a minimum turn-off time, $T_{min}^{off}$, as shown in FIG. 16, is set to lock the HVAC unit out of the "turn-on" group to prevent the unit from stalling; this case is modeled in the minimum turn-off time_case. Then, the turn-on delay, $T_{delay}^{on}$, and turn-off delay, $T_{delay}^{off}$, as shown in FIG. 16, which are caused by communication and response delays, are modeled in the response delay case. The last case is the control override case that models the impact of consumer override function.

Case A: Base Case

Figure 17A:
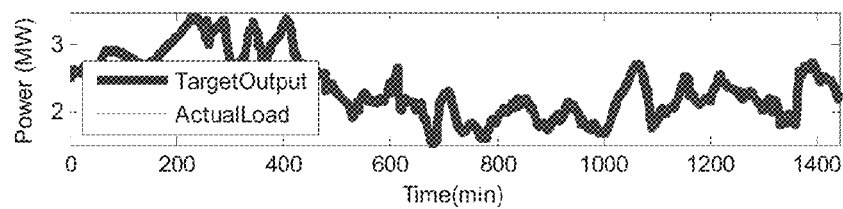
FIGS. 17A-C are graphs showing simulation results for a baseline load constructed by 1000 controlled HVAC units as shown in FIG. 10, where the load following signals are scaled to 1-minute signals and normalized to ±1 MW for the baseline load.

Load following signals are scaled to 1-minute signals and normalized to ±1 MW for a baseline load constructed by 1000 controlled HVAC units, as shown in 10. The following observations are made from simulation results:

The HVAC load follows the control signals very well for a dead band of 4° C. as shown in FIG. 17A.

Figure 17B:
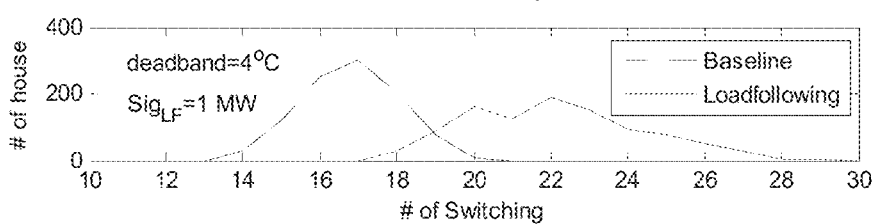
Figure 17C:
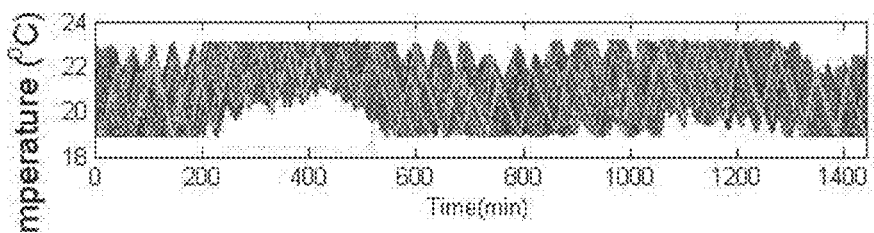

As shown in FIG. 17C, the indoor temperatures are kept within their high and low limits; the centralized-dispatch algorithm simply changes the cycle length of each HVAC unit to obtain an aggregated load profile that matches the control signal.

The daily number of switching of an HVAC unit is around 14-20, as shown in FIG. 17B. To provide the 1 MW load following service, there will be an average of 6 more switching on/off activities for each HVAC unit when dead bands set at 4° C.

Case B: Imperfect Forecast Case

Figure 18:
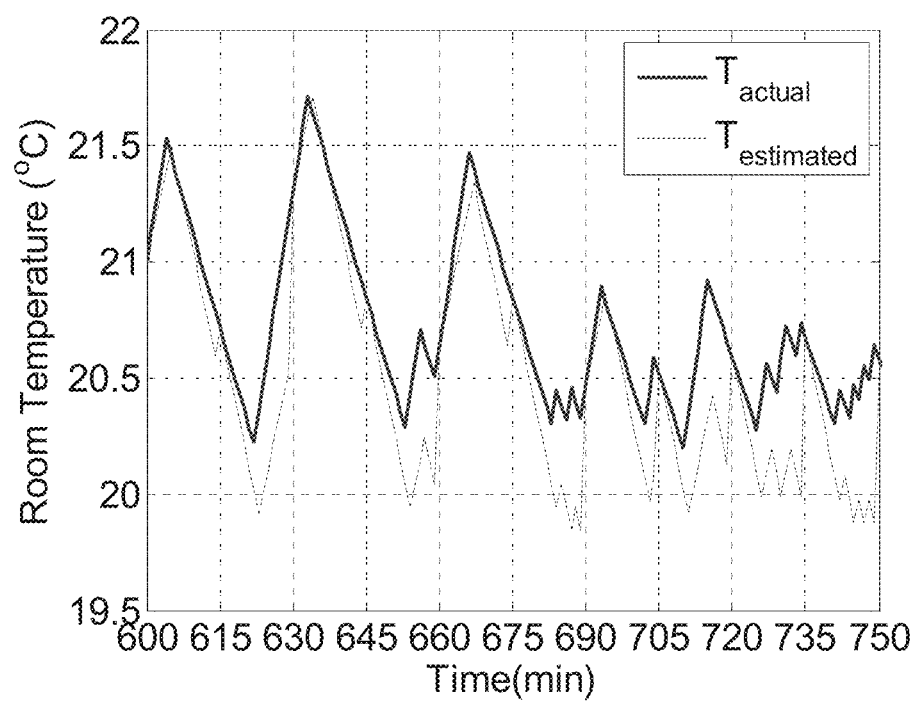
FIG. 18 is a graph illustrating a forecast correction process of an HVAC unit.
Figure 19:
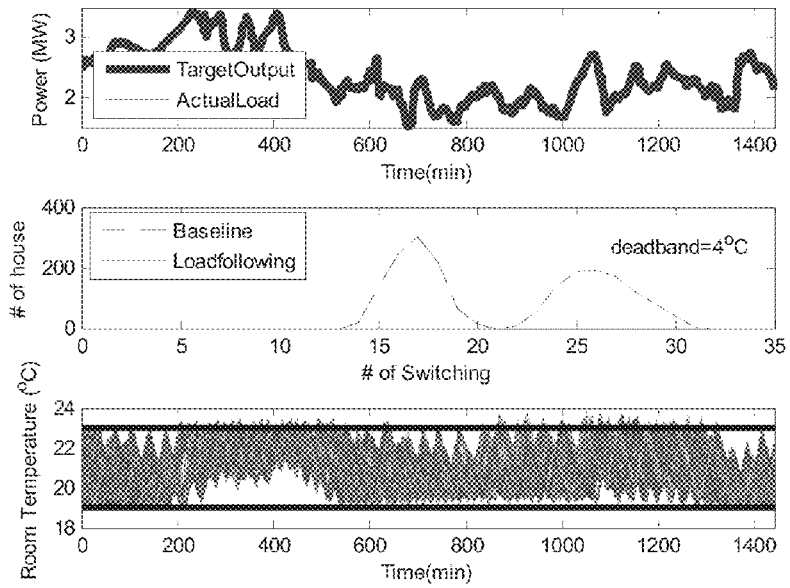
FIGS. 19A-C are graphs showing results for the imperfect forecast case ($T_{deadband}=4°$ C.).
Figure 20:
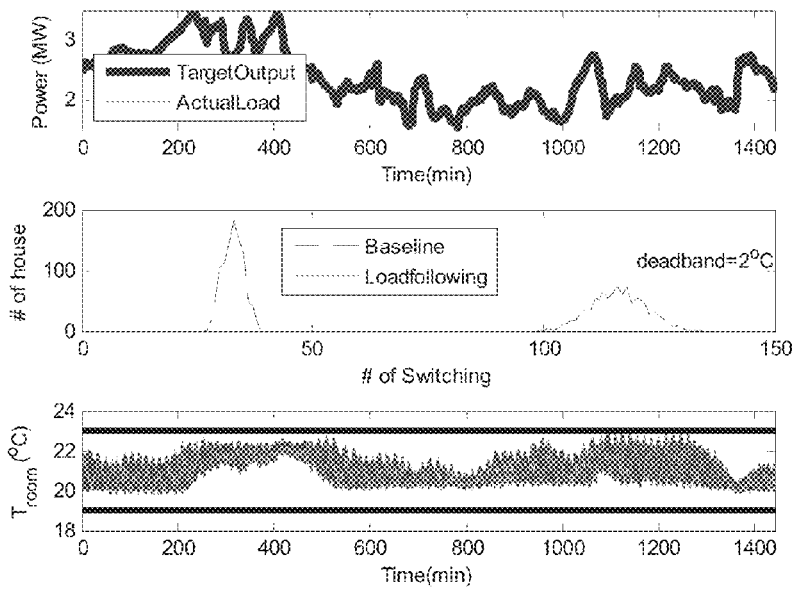
FIGS. 20A-C are graphs showing results for the imperfect forecast case ($T_{deadband}=2°$ C.).

Two scenarios are simulated: $T_{deadband}=4°$ C. (Case B1) and $T_{deadband}=2°$ C. (Case B2). Simulation results shown in FIG. 18 through FIG. 20 demonstrated:

The forecaster updates algorithm is effective. Because the forecaster located at the control center is only an approximation of the real HVAC unit, it will have prediction errors. In some cases, the forecast error may be significant, as shown in FIG. 18. However, if every 15 minutes, the error can be corrected by measurements collected from the AMI network, then the forecaster can still predict relatively well the state the HVAC unit is in.

The simplified HVAC model adjusted by 15-minute meter data updates does not degrade the capability of the HVAC load to follow the control signal, as shown in FIG. 19A. The adverse impacts are that the number of switching will increase about 3-5 times a day, see FIG. 19C and room temperatures may overshoot for half a degree or so. This is because if the forecast is inaccurate, the HVAC unit may be turned on or off for a couple of more minutes than actually needed, as shown in FIG. 19B. This may cause inconvenience to some user.

A possible solution of room temperature violations is to narrow $T_{deadband}$, as shown in FIGS. 20A-20C. The results show a trade-off between user comfort and appliance lifetimes because if the temperature band is set to be narrower, the HVAC unit will be switched on/off three times more often, as shown in FIG. 20B.

Note that if the $T_{deadband}$ is changed from 4° C. to 2° C., then the baseline load will change as well. A narrower $T_{deadband}$ requires the HVAC unit cycles more often and consumes more energy.

Case C: Minimum Turn-Off Time

We set $T_{min}^{off}$ at 5 minutes for each HVAC unit and ran two scenarios: $T_{deadband}=4°$ C. (Case C1) and $T_{deadband}=2°$ C. (Case C2). Because the priority list method sorts the HVAC units by room temperatures, the controller will first turn off units that are close to $T^+$ and turn on units that are close to $T^-$. As a result, all switched-off units stay off longer than 5 minutes. So there are no changes on the simulation results compared with Cases B1 and B2. However, in extreme weather cases, e.g. extremely cold or hot cases, the "on" time of an HVAC unit may be very long while its "off" period is extremely short; then, the algorithm may not be as effective.

Nevertheless, in those cases, the HVAC units are no longer the best resource for CRR services.

Case D: Response Delay

This case is designed to test how much tolerance the control mechanism has for response delays from resources that are not only geographically far away from each other but also different in design. The delay may be caused by communication delays or other factors. To model the impact of the response delay on the load following capability of the aggregated HVAC load, three scenarios are modeled:

Random response delay: within 2 minutes (Case D1)
Random response delay: within 5 minutes (Case D2)
95% chance to react immediately and 5% chance to have random response delay within 5 minutes (Case D3)

Figure 21:
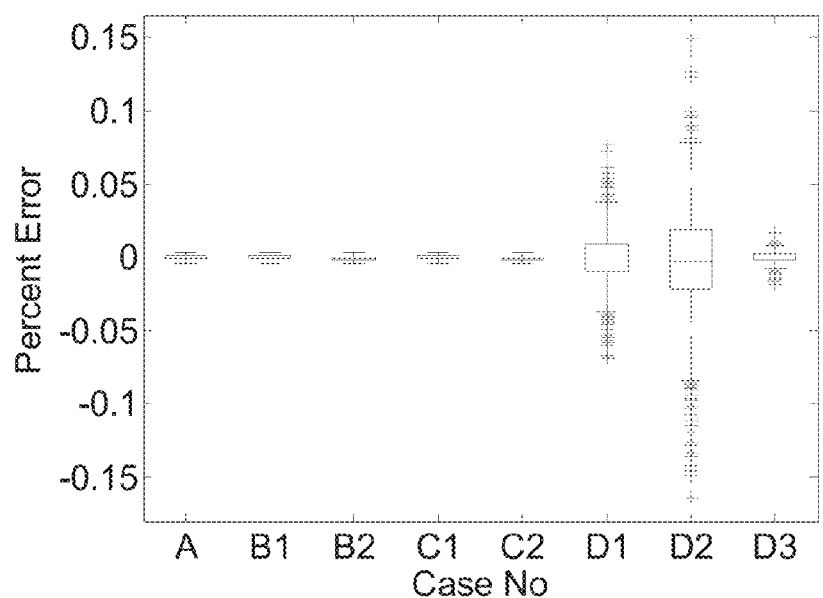
FIG. 21 is a graph illustrating MPEs of the eight simulated cases, where the response delay has the biggest impact on percentage errors.
Figure 22:
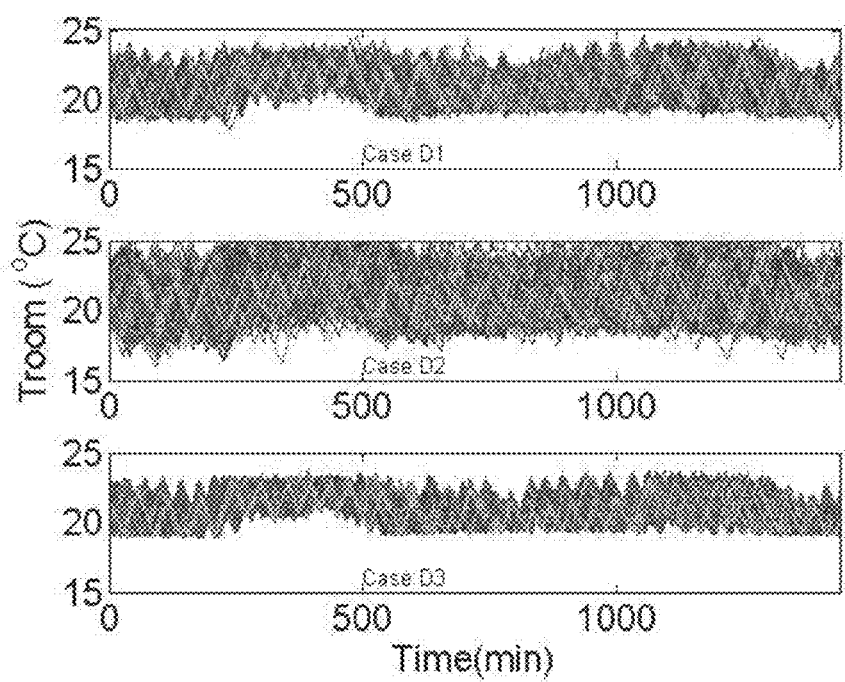
FIGS. 22A-C are graphs showing results for the response delays.

As shown in FIG. 21, among the eight cases simulated so far, the response delay has the biggest impact on percentage errors, PE, which are calculated by $$PE = \frac{P_{actual}(i) - P_c^{LF}(i)}{P_c^{LF}(i)} \quad (10)$$

where $P_{actual}$ is the actual HVAC power consumption for each case. To reduce this error, there are two options. First, if the communication system design can guarantee that at least 95% of the HVAC will receive the signal and response within 1 minute (Case D3), then the remaining 5% HVAC can have greater response delays. An alternative design is to design the system so that each HVAC unit will be guaranteed to react within 2-3 minutes (Case D1). Another issue of long response delay is that some households may be overheated or too cold, as shown in FIGS. 22A-C showing the results for the response delays. This problem will be addressed by the next section, consumer control override.

Case E: Control Override

Figure 23:
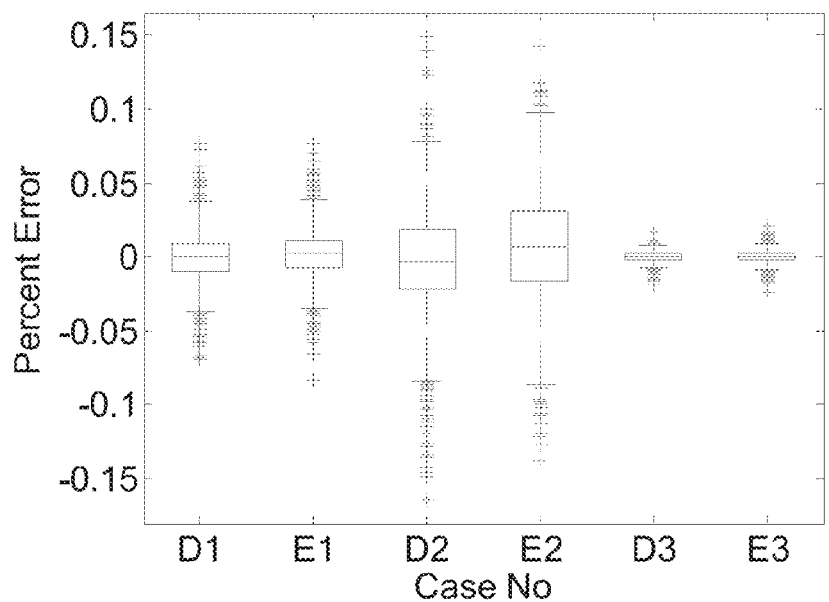
FIG. 23 is a graph showing comparison of MPEs between Case D (response delay) and Case E (control override).
Figure 24:
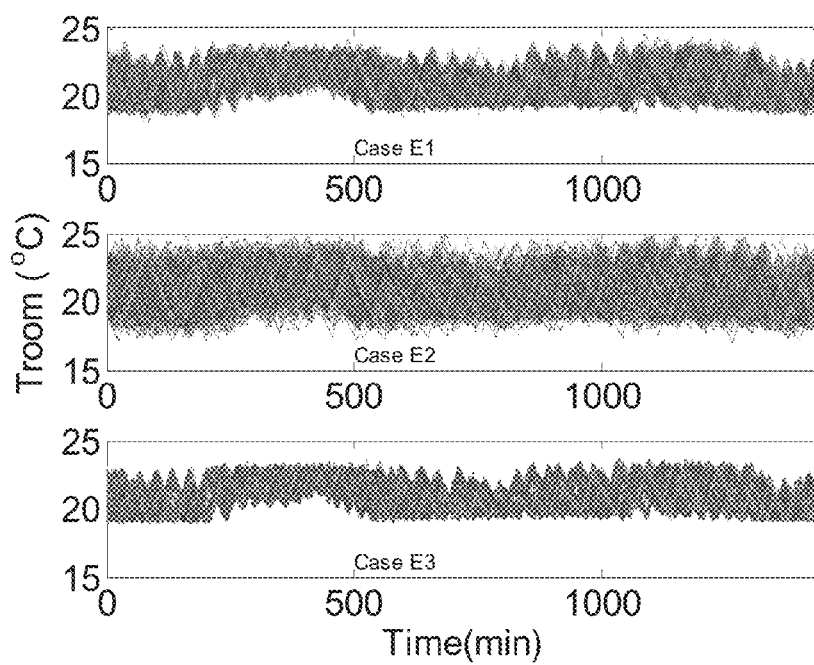
FIGS. 24A-C are graphs illustrating results for the response delays ($t_{delay}\leq5$ minutes).

In this case, the consumer override function is simulated. There are two ways to override the central controller's commands. The first option is to set up a temperature high limit, $T_{hlim}$, and low limit, $T_{Llim}$, to force the HVAC to turn on or off when the room temperature is beyond the two limits (Case E); the second option is to use a button to override the HVAC from participating the CRR service. In the latter case, the central controller can simply remove the HVAC from the controllable resources and recruit another standby HVAC so this scenario is not simulated. For the first case, we assume every consumer set a random $T_{hlim}$ between $[T^+,T^++2]$ and $T_{Llim}$ between $[T^-,T^--2]$. Add the override settings to each HVAC unit and rerun the three random response delay scenarios (Cases E1 through E3). As shown in FIG. 23, which shows a comparison of MPEs between Case D and E and FIGS. 24A-C, which shown the results for the response delays ($t_{delay}<=5$ minutes), control errors didn't change significantly but the room temperature is limited within the range defined by the user.

Summary of Results

Table 1 provides a performance summary from the simulation results.

TABLE 1

A summary of performance

| | A | B1 | B2 | C1 | C2 | D1 | D2 | D3 | E1 | E2 | E3 |
|---|---|---|---|---|---|---|---|---|---|---|---|
| $E_{actual} - E_{baseline}$ (kWh/HVAC) | −2.6 | −2.5 | −2.3 | −2.5 | −2.3 | −2.4 | −1.4 | −2.5 | −4.1 | −9.2 | −2.9 |
| Mean Percent Error | 0.1% | 0.3% | 0.1% | 0.1% | 0.1% | 1.3% | 2.5% | 0.3% | 1.3% | 2.9% | 0.3% |
| Duration (min/HVAC) Troom >23° C. | 0.0 | 1.9 | 0.0 | 1.9 | 0.0 | 4.8 | 23.5 | 2.4 | 3.7 | 10.2 | 1.7 |
| Duration (min/HVAC) Troom <19° C. | 0.0 | 0.0 | 0.0 | 0.0 | 0.0 | 0.0 | 0.8 | 0.0 | 0.0 | 0.4 | 0.0 |

The total energy consumption of the HVAC load for each case, $E_{actual}$, is calculated to compare with the baseline load energy consumption, $E_{baseline}$. The mean percentage error, MPE, is calculated by $$MPE = \frac{1}{n}\sum_{i=1}^{n}\left|\frac{P_{actual}(i) - P_c^{LF}(i)}{P_c^{LF}(i)}\right| \quad (11)$$

Case A represents one ideal control case. Case E1 through E3 are the cases that considered all the trade-offs. The modeling results demonstrated:

Providing CRRs will not necessarily increase the energy consumption of each HVAC. The net energy consumption may even drop as shown in the first row in Table 1.

The quality of the CRR service is satisfactory. The MPE (the second row in Table 1) is very low for all cases except for D2 and E2 when the HVAC units have long response delays. Therefore, in designing the control network, one may consider using one of the two ways introduced in Section IV.D to minimize the response delay.

The consumer comfort will not be significantly compromised. As shown in Rows 3 and 4 in Table 1, the average duration for an HVAC unit to stay out of 19-23° C. range is only a few minutes daily except for Cases D2 and E2.

If the hourly regulation price is $20/MW, then the 1000 HVAC will receive $20×24×30=$14400 for 24-hour services for 30 days. That means $14.40 per month income for an HVAC. Thus, with a smart grid in place, load service providers can extend the control to TCAs and collect additional revenue from the ancillary service market to recover the cost invested in the two-way communication and control network. Customers can also receive additional revenues by offering their appliances for load balancing services and help integrate more renewable resources into the power grid without compromising their comfort levels.

In the above examples, design considerations of a centralized controller for TCA units to provide CRR services were described. First, simplified models of TCA units were developed. Then, the baseline aggregated HVAC power output was estimated from the modeled average load profile based on outdoor temperature forecast. Next, the control method of HVAC units for intra-hour load balancing was proposed. Finally, operations of HVAC units were numerically simulated, and influences of different control parameters were evaluated. The results of this simulated study indicated that approximately 1000 HVAC units (rated at 6 kW with 4° C. dead band) can provide 24 hours of intra-hour continuous balancing services (1-MW bi-directional signals) by the proposed control scheme.

Load Balancing Modeling Results

Two sets of control signals were studied: load following and area control error (ACE) signals.

Response to Load Following Signals

Figure 25:
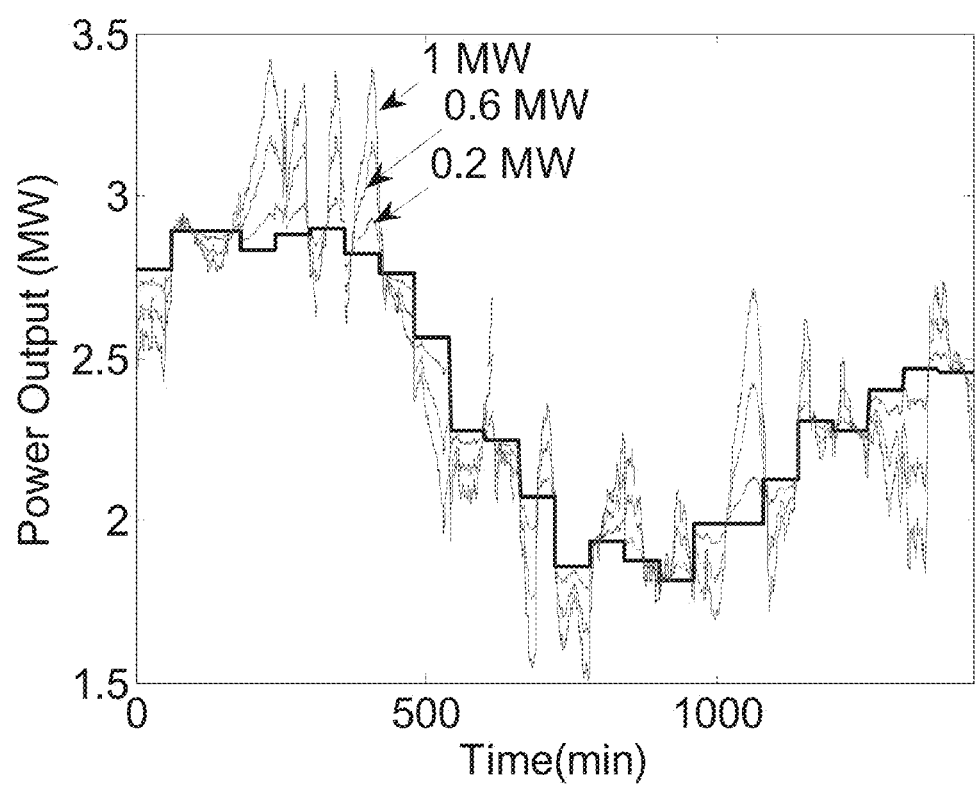
FIG. 25 is a graph illustrating different load following signals

The load following signal was normalized to 0.2, 0.6, and 1 MW, as shown in FIG. 25.

Figure 26:
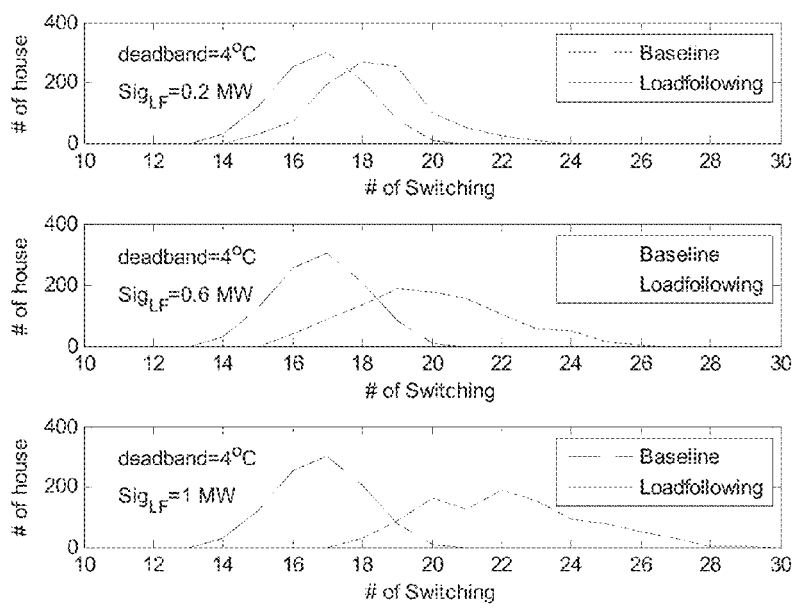
FIGS. 26A-C are graphs illustrating the impact of different control signal magnitudes on HVAC daily cycles.
Figure 27:
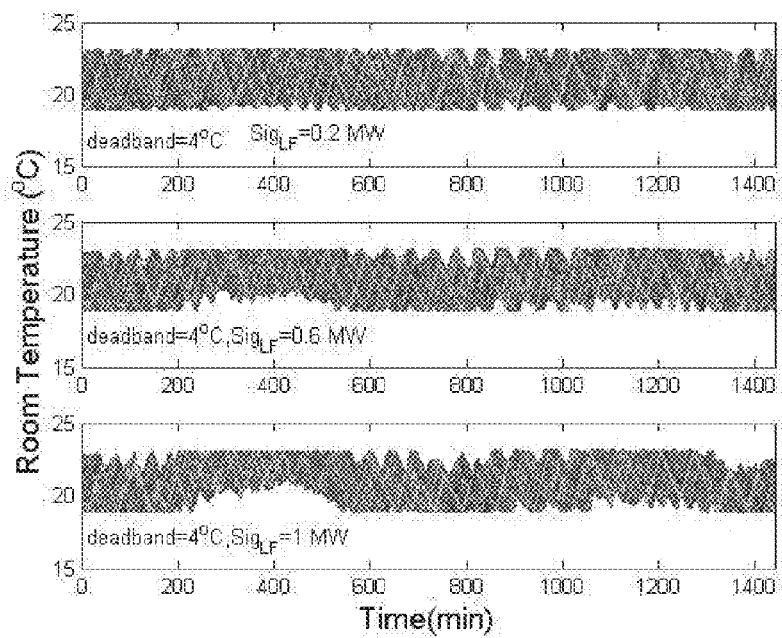
FIGS. 27A-C are graphs illustrating the impact of different control signal magnitudes on room temperature profiles.

1000 HVAC units (rated at 6 kW) were used; thermostat high limit, $T^+$, is 23° C. with a dead band of 2 or 4° C. Therefore, thermostat low limits are 21° C. or 19° C. Outdoor temperature profile is picked from $T_{ave}=-10$, 0, and 15° C. The following observations are made from the simulation results:

- The HVAC load follows the control signals very well for a dead band of 4° C.
- The number of cycles of a heater unit ($T_{ave}=0°$ C.; dead band is 4° C.) is around 14-20, see FIGS. 26A-C showing the impact of different control signal magnitudes on HVAC daily cycles. To provide the 0.2-1 MW load following service, there will be 2 more cycles on average for each HVAC unit with dead bands set at 4° C.
- When the dead band is narrower, the capability of the HVAC load to follow the load following signal is reduced, because tracking the control signals will partially synchronize diversified HVAC loads, as shown in FIGS. 27A-C, FIGS. 28A-C, and FIGS. 31A-C. When $T_{room}$ of all households is close to $T^+$ or $T^-$, the continuing "on" or "off" status of the HVAC units will cause $T_{room}$ to exceed $T^+$ or $T^-$, as shown at 420 minutes in FIG. 28C ($T_{room}>T^+$). The occurrence of the violation can be minimized by increasing the number of HVAC units, increasing $T^+$, or decreasing $T^-$.
- If the dead band is 2° C., the HVAC unit cycles two to four times more often to follow the control signals, as shown in FIGS. 29A-B, shortening the life of the unit. FIGS. 29A-B illustrate the impact of dead bands on HVAC daily cycles.
- When outdoor temperatures are high, the HVAC unit may be unable to provide enough load following capacity because its base load may be lower than the required load following down capacity, as shown, for example, in the 15° C. case in FIG. 30. Note that the indoor temperatures in all cases, as shown in FIGS. 31A-C which illustrate the impact of outdoor room temperatures on room temperature profiles, are always kept within their high and low limits; the centralized-dispatch algorithm simply changes the cycle length of each HVAC unit to obtain an aggregated load profile that matches the control signal.

Response to ACE Signals

ACE signals were downloaded from the PJM Interconnection LLC ("PJM") website. Note that ACE signals vary much faster than load following signals. To make the ACE cases comparable to the load following cases, the ACE signal was also normalized to 0.2, 0.6, and 1 MW, respectively; 1000 HVAC units were used; $T^+$ is 23° C. with a dead band of 2° C. or 4° C. Outdoor temperature profile is picked from $T_{ave}=-10$, 0, and 15° C.

Figure 32:
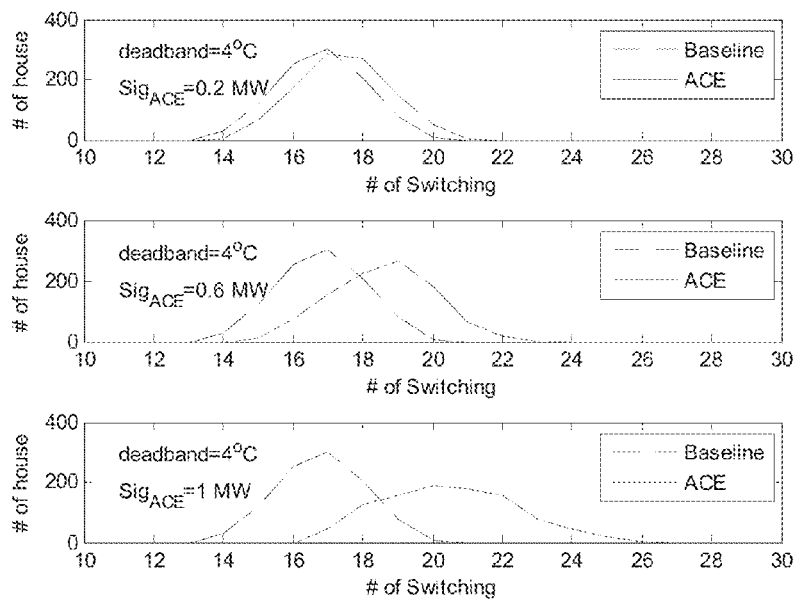
FIGS. 32A-C are graphs illustrating the impact of different control signal magnitudes on HVAC daily cycles.
Figure 33:
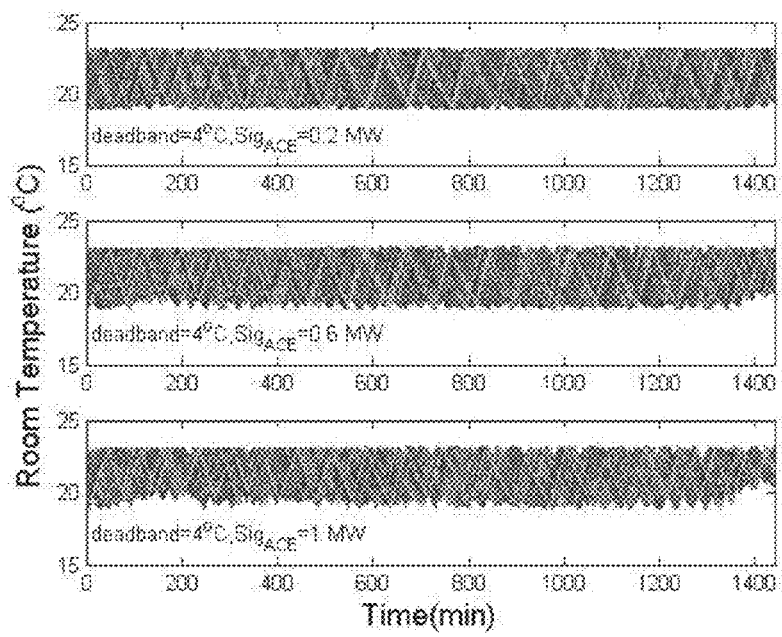
FIGS. 33A-C are graphs illustrating the impact of different control signal magnitudes on room temperature profiles.
Figure 34:
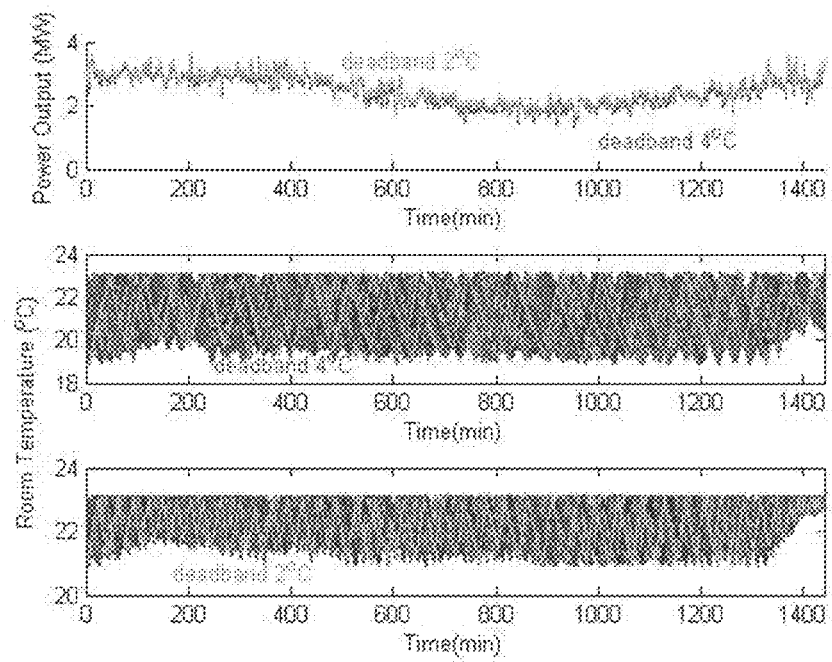
FIGS. 34A-C are graphs illustrating the impact of different dead bands on room temperature profiles.
Figure 35:
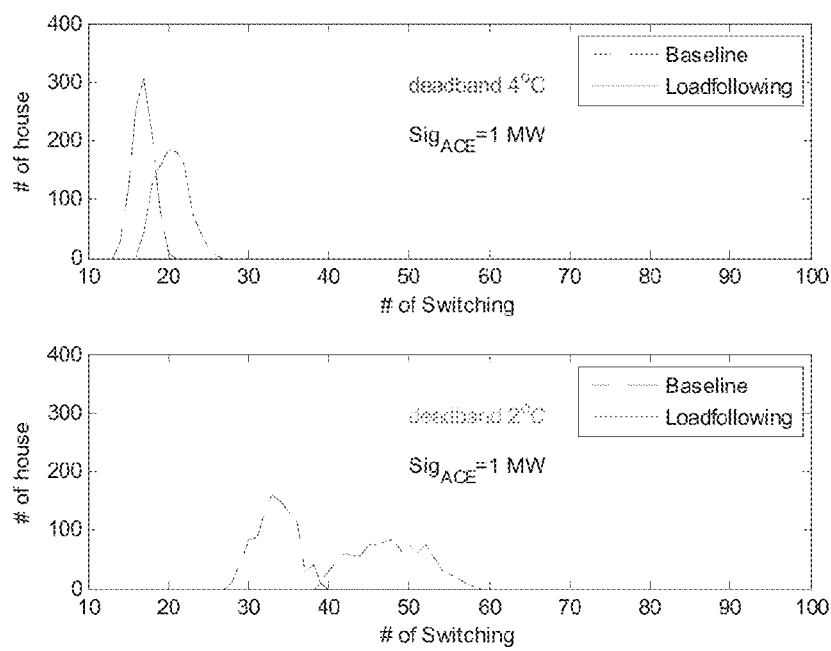
FIGS. 35A-B are graphs illustrating the impact of dead band on HVAC daily cycles.
Figure 36:
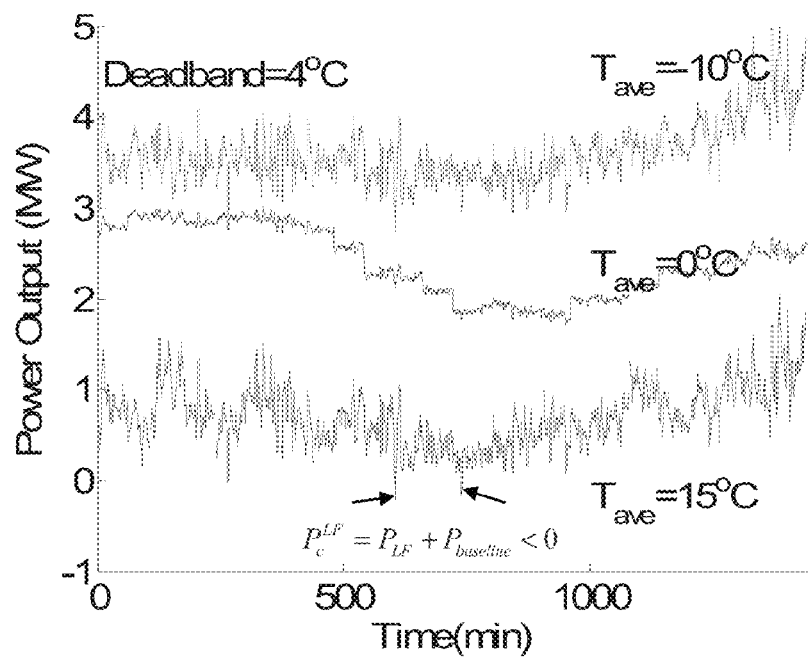
FIG. 36 is a graph illustrating the impact of outdoor temperatures on control signal following capabilities.
Figure 37:
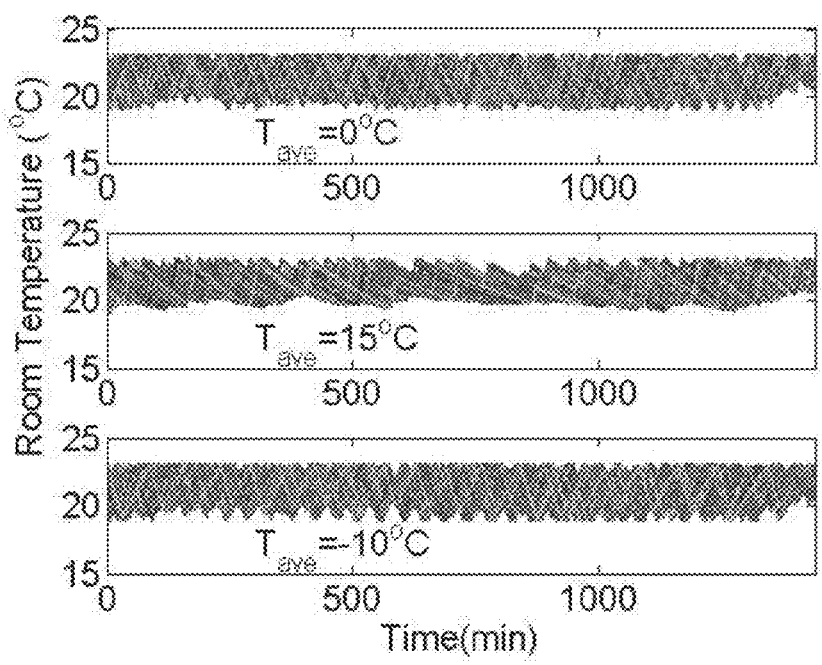
FIGS. 37A-C are graphs illustrating the impact of different outdoor temperature profiles on room temperatures (dead band: 4° C.).
Figure 40:
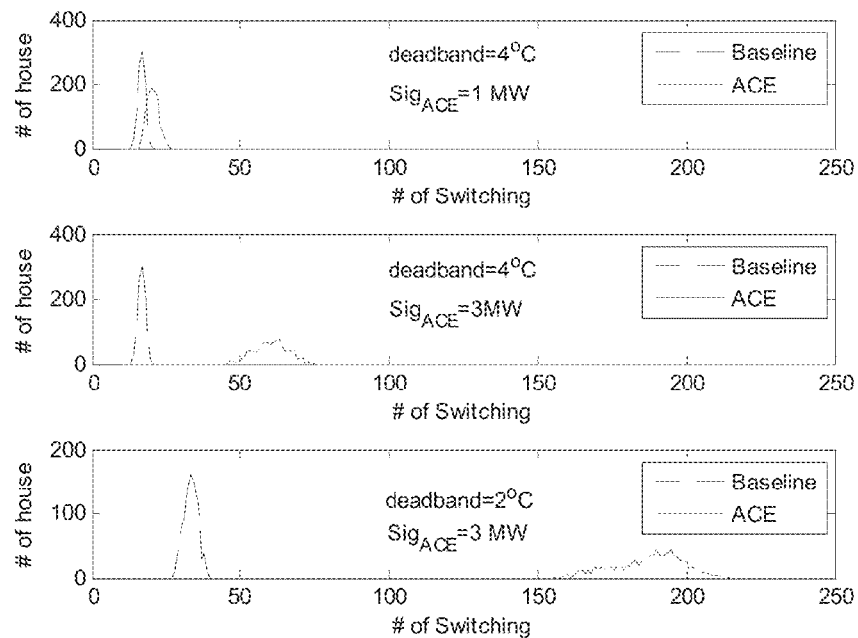
FIGS. 40A-C are graphs illustrating cycling status of HVAC units when following ±3 MW ACE signals.
Figure 41:
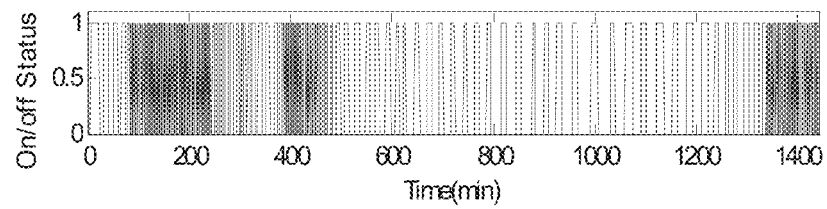
FIG. 41 is a graph illustrating cycling status of an HVAC unit when following ±3 MW ACES signals (deadband: 2° C.).

The following observations are made from simulation results:

- Following fast varying signals would be problematic for bulk regulating units such as hydro power plants and bulk energy storage devices because of ramping constraints. However, because the basic control unit of an aggregated TCA load is a 4-6 kW unit, the increases in daily cycles in the ACE following cases are similar to those of the load following cases. This is because each HVAC unit would have switched on/off at its own rhythm if not controlled; rearranging the HVAC units' on/off time slots will not significantly impact their total number of cycles and room temperature profiles if the signal magnitude is close to the magnitude and frequency of the normal HVAC load variations, as shown in FIGS. 32A-C, which illustrate the impact of different control signal magnitudes on HVAC daily cycles and FIGS. 33A-C, which illustrate the impact of different control signal magnitudes on room temperature profiles.
- As shown in FIGS. 34A-C, which illustrates the impact of different dead bands on room temperature profiles and FIGS. 35A-B, which illustrates the impact of dead band on HVAC daily cycles, similar to the load following cases, a narrower room temperature dead band limits the capability of the HVAC unit to follow the ACE signal, causing higher increases in daily cycles.
- At higher outdoor temperatures, the HVAC unit cycles less. When the minimum power consumption of the aggregated HVAC baseline load is lower than the required ACE downward signals, all HVAC units will be forced off in the 15° C. case, as shown in FIG. 36, which illustrates the impact of outdoor temperatures on the control signal following capabilities, FIGS. 37A-C, which illustrates the impact of different outdoor temperature profiles on room temperatures with a dead band of 4° C., and FIGS. 38A-C, which illustrate the impact of different outdoor temperature profiles on the HVAC daily operation. Therefore, the upward and downward load balancing capacity of the HVAC load is limited by the baseline settings that are determined by outdoor temperature profiles and customer room temperature dead band preference. It is then critical to predict the two factors accurately when considering the design of such direct load control schemes.
- As shown in FIGS. 39A-C, which shows examples of out-of-capacity issues and FIGS. 40A-C, which shows the cycling status of HVAC units for a higher control signal magnitude of ±3 MW, the HVAC regulating capability is soon depleted. All HVAC units are quickly synchronized and frequently turned on and off to follow the control signal. The on/off plot of an HVAC unit is shown in FIG. 41 when following ±3 MW ACE signals with a dead band of 2° C. This behavior damages the HVAC unit lifetime and is undesirable. In addition, the room temperatures can no longer be held within the desired range. This result shows that the number of controlled HVAC units in response to a certain magnitude of load balancing signal needs to be carefully selected to leave a safe margin to prevent such synchronized switching phenomena. A randomization period may be needed periodically to regain the load diversity.

The direct control of HVAC units to adjust their power consumption to follow intra-hour load balancing signals was presented in the load following and ACE signals examples above. First, a simplified model of a space heating unit was developed while considering the thermal energy balance. Then, the baseline aggregated HVAC power output was estimated from the modeled average load profile based on outdoor temperature forecast. Next, the control method of HVAC units for intra-hour load balancing was proposed. Finally, operations of HVAC units were numerically simulated, and their capability to provide load following and regulation services was evaluated. The results indicated that approximately 1000 HVAC units (rated at 6 kW with 4° C. dead band) can provide 24 hours of load following or regulation services (1-MW bi-directional signals) by the proposed control scheme. The modeling results suggest that with a smart grid in place, load service providers can extend the control to TCAs and collect additional revenue from the ancillary service market to recover the cost invested in the two-way communication and control network. Customers can receive additional revenue by offering their appliances for high value load balancing services and help integrate more renewable resources into the power grid.

Figure 42:
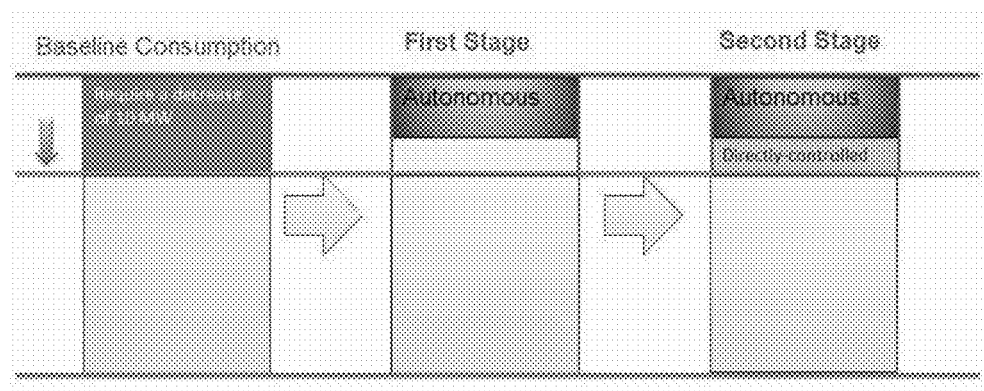
FIG. 42 is a schematic block diagram illustrating a two-stage demand response system, in accordance with one embodiment of the present invention.

FIG. 42 is a schematic block diagram illustrating a two-stage demand response system, in accordance with one embodiment of the present invention. This figure shows one example of how the demand response system can be used to reduce consumption (e.g., 10 MW) against the baseline consumption. In this diagram, as one example, if a decrease of 10 MW is required, a controller (not shown) will send a signal to the autonomous and or indirectly-controlled loads, and the indirectly controlled loads may response by, for example, a 6 MW reduction. The controller will then send a signal to the directly-controlled loads, and the directly controlled loads may response by, for example, a 4 MW reduction to make up the difference.

Figure 43:
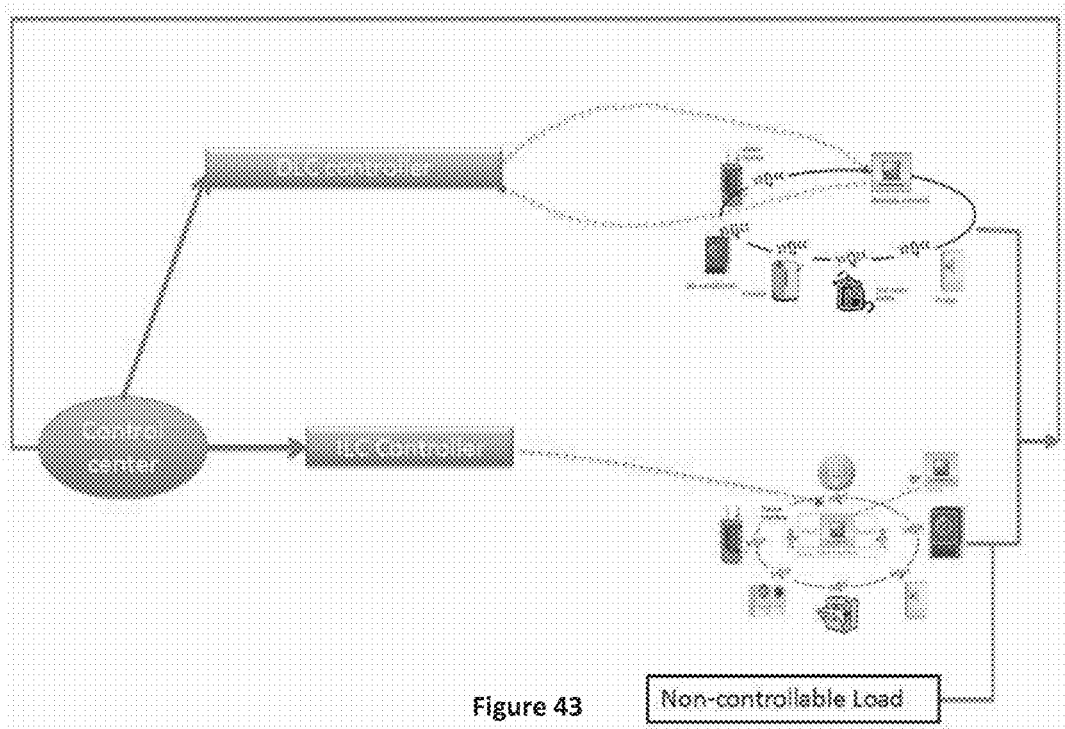
FIG. 43 is a schematic block diagram illustrating a demand response system, in accordance with one embodiment of the present invention.

FIG. 43 is a schematic block diagram illustrating a demand response system, in accordance with one embodiment of the present invention. In this embodiment, the system includes a controller or control center, a DLC controller and directly controlled loads, an ILC controller and indirectly controlled loads; non-controllable loads such as, but not limited to, buildings, computers and light; and a feedback line for sending results back to the controller.

Still referring to FIG. 43, the controller controls the ILC controller to send a primary response signal to the indirectly controlled loads at certain time steps. The controller also controls the DLC controller to send a secondary response signal to the directly controlled loads at certain, but more frequent, time steps to compensate for discrepancies between targeted and actual output results of the primary response.

In one embodiment, the primary response signal is sent approximately every 15 minutes and the secondary response signal is sent approximately every minute.

In one embodiment, the DLC and ILC controllers are optional. In that case, the controller sends signals directly to the indirectly controlled loads and the directly controlled loads.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

We claim:

1. A method of controlling aggregated thermostatically controlled appliances (TCAs) for demand response comprising:
   a. formulating a targeted load profile;
   b. generating a forecasted load profile;
   c. prioritizing the TCAs within a "on" or "off" control group based on their operating temperatures; wherein the prioritizing the TCAs further comprises prioritizing a first "on" group in descending order to turn off the TCA in heating mode, the TCA whose room temperature is closest to the upper thermostat setting is at the top of the queue to be turned off; and a second "off" group in ascending order to turn on the TCA in the heating mode, the TCA whose room temperature is closest to the lower thermostat setting is at the top of the queue to be turned on;
   d. determining the "on" or "off" status of the TCAs;
   e. calculating the difference between the forecasted load profile and the targeted load profile to determine the number of TCAs to be turned on or off, wherein the targeted load profile includes combining a baseline load, which is based on the forecasted load profile, with a control signal, the control signal being a load reduction or a load increase signal, and the baseline is a forecast of the TCAs consumptions for the scheduling period; and
   f. sending command signals to turn on or turn off, in order of priority, the TCAs whose room temperatures are closer to upper or lower thermostat settings of the TCAs.

2. The method of claim 1 further comprising monitoring the status of the TCAs on a periodic time interval schedule.

3. The method of claim 1 further comprising separating each TCA into the control groups.

4. The method of claim 1 wherein the generating a forecasted load profile further comprises forecasting a TCA operating status.

5. The method of claim 4 wherein the operating status includes "on" or "off" status and temperature.

6. The method of claim 4 wherein the generating a forecasted load profile further comprises generating a turn on/off list for the TCAs.

7. The method of claim 1 wherein the prioritizing the TCAs further comprises prioritizing a first "on" group in ascending order to turn off the TCA in cooling mode and a second "off" group in descending order to turn on the TCA in the cooling mode based on thermostat settings of the TCAs and/or room temperature.

8. The method of claim 1 wherein the TCAs comprise at least one of the following: heating, ventilation and air conditioning (HVAC) units, refrigerators, water heaters, coffee pots, rice cookers, thermostat cups, and electric hot bottle warmer.

9. The method of claim 1 further comprising updating the on/off status, operating temperatures, and the load profiles based on actual measurements collected from the TCAs.

10. The method of claim 1 wherein the calculating a targeted load profile comprises generating a load profile based on historical data and temperature forecast information.

11. The method of claim 1 wherein the generating a forecasted load profile comprises obtaining previous operating temperature and on/off status information of the TCAs.

12. A system for controlling thermostatically controlled appliances (TCAs) comprising: A two-way communication network between a controller and the TCAs; the controller formulates a targeted load profile and a forecasted load profile, wherein the targeted load profile includes combining a baseline load, which is based on the forecasted load profile, with a control signal, the control signal being a load reduction or a load increase signal, and the baseline is a forecast of the TCAs consumptions for the scheduling period, wherein the controller prioritizes the TCA within a "on" control group or a "off" control group, determines the "on" or "off" status of the TCAs, calculates difference between the forecasted load profile and the targeted load profile to determine the number of TCAs to be turned on or off, and sends command signals to turn on or turn off, in order of priority, the TCAs whose room temperatures are closer to upper or lower thermostat settings of the TCAs;

wherein the controller prioritizes a first "on" group in descending order to turn off the TCA in heating mode, the TCA whose room temperature is closest to the upper thermostat setting is at the top of the queue to be turned off; the controller prioritizes a second "off" group in ascending order to turn on the TCA in the heating mode, the TCA whose room temperature is closest to the lower thermostat setting is at the top of the queue to be turned on.

13. The system of claim 12 wherein the controller monitors the status of the TCAs on a periodic time interval schedule.

14. The system of claim 12 wherein the controller separates each TCA into the control groups.

15. The system of claim 12 wherein the controller forecasts a TCA operating status.

16. The system of claim 15 wherein the operating status includes "on" or "off" status and temperature.

17. The system of claim 15 wherein the controller generates a turn on/off list for the TCAs.

18. The system of claim 12 wherein the controller prioritizes a first "on" group in ascending order to turn off the TCA in cooling mode and a second "off" group in descending order to turn on the TCA in the cooling mode based on thermostat settings of the TCAs and/or room temperature.

19. The system of claim 12 wherein the TCAs comprises at least one of the following: heating, ventilation and air conditioning (HVAC) units, refrigerators, water heaters, coffee pots, rice cookers, thermostat cups, and electric hot bottle warmers.

20. The system of claim 12 wherein the controller updates the on/off status, operating temperatures, and the load profiles based on actual measurements collected from the TCAs.

21. The system of claim 12 wherein the controller generates a load profile based on historical data and temperature forecast information.

22. The system of claim 12 wherein the controller obtains previous operating temperature and on/off status information of the TCAs.

23. A method of controlling aggregated thermostatically controlled appliances (TCAs) for demand response comprising:
    a. formulating a targeted load profile;
    b. generating a forecasted load profile;
    c. prioritizing the TCAs within a "on" or "off" control group based on their operating temperatures; wherein the prioritizing the TCAs further comprises prioritizing a first "on" group in descending order to turn off the TCA in heating mode, the TCA whose room temperature is closest to the upper thermostat setting is at the top of the queue to be turned off; and a second "off" group in ascending order to turn on the TCA in the heating mode, the TCA whose room temperature is closest to the lower thermostat setting is at the top of the queue to be turned on;
    d. determining the "on" or "off" status of the TCAs;
    e. sending command signals to turn on or turn off, in order of priority, the TCAs whose room temperatures are closer to upper or lower thermostat settings of the TCAs;
    f. monitoring the status of the TCAs on a periodic time interval schedule;
    g. calculating the difference between the forecasted load profile and the targeted load profiles to determine the number of TCAs to be turned on or off, wherein the targeted load profile includes combining a baseline load, which is based on the forecasted load profile, with a control, the control signal being a load reduction or a load increase signal, and the baseline is a set of load target consumptions for a scheduling period or a forecast of the TCAs consumptions for the scheduling period; and
    h. updating the on/off status, operating temperatures, and the load profiles based on actual measurements collected from the TCAs.

* * * * *